US009202297B1

(12) United States Patent  
Winters et al.

(10) Patent No.: US 9,202,297 B1
(45) Date of Patent: Dec. 1, 2015

(54) DYNAMIC EXPANSION OF DATA VISUALIZATIONS

(75) Inventors: Alan Winters, Lindon, UT (US); Amir H. Raubvogel, Redwood City, CA (US)

(73) Assignee: Domo, Inc., American Fork, UT (US)

( * ) Notice: Subject to any disclaimer, the term of this patent is extended or adjusted under 35 U.S.C. 154(b) by 701 days.

(21) Appl. No.: 13/535,019

(22) Filed: Jun. 27, 2012

Related U.S. Application Data

(60) Provisional application No. 61/506,912, filed on Jul. 12, 2011.

(51) Int. Cl.
```
G09G 5/00      (2006.01)
G06T 11/60     (2006.01)
G06T 11/00     (2006.01)
G06T 19/00     (2011.01)
```

(52) U.S. Cl.
CPC ............... G06T 11/60 (2013.01); *G06T 11/00* (2013.01); *G06T 19/00* (2013.01)

(58) Field of Classification Search
CPC ............. H04N 1/00442; H04N 1/0044; G06F 3/04883; G06F 3/0488; G06F 2203/04808; G06F 3/017; G06F 9/4443; G06F 3/0481; G06T 11/60; G06T 19/00; G06T 11/00; G06T 19/20
See application file for complete search history.

(56) References Cited

U.S. PATENT DOCUMENTS

| | | | | |
|---|---|---|---|---|
| 5,359,712 A * | 10/1994 | Cohen et al. | | 715/723 |
| 5,375,201 A * | 12/1994 | Davoust | | 715/201 |
| 5,416,895 A * | 5/1995 | Anderson et al. | | 715/209 |
| 5,423,033 A * | 6/1995 | Yuen | | 707/703 |
| 5,461,708 A * | 10/1995 | Kahn | | 345/440 |
| 5,550,964 A * | 8/1996 | Davoust | | 345/440 |
| 5,581,678 A * | 12/1996 | Kahn | | 345/440 |
| 5,634,133 A * | 5/1997 | Kelley | | 715/209 |
| 5,844,558 A * | 12/1998 | Kumar et al. | | 345/440.2 |
| 5,990,888 A * | 11/1999 | Blades et al. | | 715/764 |
| 6,023,280 A * | 2/2000 | Becker et al. | | 345/440 |
| 6,626,959 B1 * | 9/2003 | Moise et al. | | 715/210 |
| 6,995,768 B2 * | 2/2006 | Jou et al. | | 345/440 |
| 7,002,580 B1 * | 2/2006 | Aggala et al. | | 345/440 |
| 7,705,847 B2 * | 4/2010 | Helfman et al. | | 345/440 |
| 7,788,606 B2 * | 8/2010 | Patel et al. | | 715/863 |
| 8,099,674 B2 * | 1/2012 | Mackinlay et al. | | 715/764 |
| 8,176,096 B2 * | 5/2012 | Allyn et al. | | 707/805 |
| 8,579,814 B2 * | 11/2013 | Fotiades et al. | | 600/301 |
| 8,661,358 B2 * | 2/2014 | Duncker et al. | | 715/765 |
| 8,812,947 B1 * | 8/2014 | Maoz et al. | | 715/212 |
| 8,863,019 B2 * | 10/2014 | Pourshahid et al. | | 715/771 |

(Continued)

*Primary Examiner* — Devona Faulk
*Assistant Examiner* — Charles L Beard
(74) *Attorney, Agent, or Firm* — Patent Law Works LLP

(57) ABSTRACT

A user can dynamically invoke and control the display of secondary data visualizations based on a selected element of a primary data visualization. Previews of the secondary data visualizations are presented as the user interacts with the primary visualization. In response to user input, previews can be dynamically expanded, allowing a user to dynamically "drill down" into selected elements of the primary data visualization. Any suitable input mechanism can be used, including for example, a gesture such as a two-finger spreading motion to invoke previews of available secondary visualizations, wherein the axis defined by two points of contact determines which of the displayed previews of secondary visualizations is highlighted and/or expanded. In various embodiments, a hierarchy of visualizations can be established, and the user can navigate among two or more levels of visualizations in the same interactive manner.

40 Claims, 16 Drawing Sheets

(56) References Cited

U.S. PATENT DOCUMENTS

| | | | |
|---|---|---|---|
| 2003/0128883 A1* | 7/2003 | Kim et al. | 382/243 |
| 2005/0068320 A1* | 3/2005 | Jaeger | 345/440 |
| 2005/0275622 A1* | 12/2005 | Patel et al. | 345/156 |
| 2006/0041178 A1* | 2/2006 | Viswanathan et al. | 600/11 |
| 2008/0115049 A1* | 5/2008 | Tolle et al. | 715/209 |
| 2009/0006318 A1* | 1/2009 | Lehtipalo et al. | 707/2 |
| 2009/0077501 A1* | 3/2009 | Partridge et al. | 715/846 |
| 2009/0096812 A1* | 4/2009 | Boixel et al. | 345/646 |
| 2010/0005008 A1* | 1/2010 | Duncker et al. | 705/27 |
| 2010/0005411 A1* | 1/2010 | Duncker et al. | 715/769 |
| 2010/0070254 A1* | 3/2010 | Tsai et al. | 703/11 |
| 2010/0080491 A1* | 4/2010 | Ohnishi | 382/298 |
| 2010/0097322 A1* | 4/2010 | Hu et al. | 345/173 |
| 2010/0138766 A1* | 6/2010 | Nakajima | 715/767 |
| 2010/0194778 A1* | 8/2010 | Robertson et al. | 345/619 |
| 2010/0211895 A1* | 8/2010 | Mistry et al. | 715/764 |
| 2010/0231536 A1* | 9/2010 | Chaudhri et al. | 345/173 |
| 2010/0238176 A1* | 9/2010 | Guo et al. | 345/440 |
| 2011/0016433 A1* | 1/2011 | Shipley | 715/849 |
| 2011/0074716 A1* | 3/2011 | Ono | 345/173 |
| 2011/0115814 A1* | 5/2011 | Heimendinger et al. | 345/619 |
| 2011/0141031 A1* | 6/2011 | McCullough et al. | 345/173 |
| 2011/0283231 A1* | 11/2011 | Richstein et al. | 715/810 |
| 2012/0089933 A1* | 4/2012 | Garand et al. | 715/765 |
| 2012/0092286 A1* | 4/2012 | O'Prey et al. | 345/174 |
| 2012/0166470 A1* | 6/2012 | Baumgaertel et al. | 707/769 |
| 2012/0180002 A1* | 7/2012 | Campbell et al. | 715/863 |
| 2012/0254783 A1* | 10/2012 | Pourshahid et al. | 715/771 |
| 2013/0080444 A1* | 3/2013 | Wakefield et al. | 707/748 |
| 2013/0097177 A1* | 4/2013 | Fan et al. | 707/748 |
| 2013/0145244 A1* | 6/2013 | Rothschiller et al. | 715/212 |

* cited by examiner

DYNAMIC EXPANSION OF DATA VISUALIZATIONS

CROSS-REFERENCE TO RELATED APPLICATION

The present application claims priority from U.S. Provisional Application Ser. No. 61/506,912 for "Drill by Expansion," filed Jul. 12, 2011, which is incorporated herein by reference.

FIELD OF THE INVENTION

The present invention relates to interactive graphical displays of data visualizations representing quantitative data.

DESCRIPTION OF THE RELATED ART

Electronic devices—such as desktop, laptop, and tablet computers, as well as mobile devices such as smartphones—are often capable of storing and displaying various forms of data visualizations (or "reports") representing quantitative data. Data visualizations can represent any information, such as financial information, marketing information, and/or the like, in any suitable tabular, text-based, and/or graphical format.

It is known in the art to provide interactivity for data visualizations. In many computing environments, including web-based applications such as browsers for presenting web pages, a user can interact with a data visualization so as to change the format and/or nature of the displayed data, to highlight certain elements and/or obscure others, and/or to zoom into and out of a displayed report.

One particular form of interactivity is to provide a mechanism for a user to invoke and/or control the display of secondary reports from a primary report. Yuen, U.S. Pat. No. 5,423,033 for "Report Generation System and Method", issued Jun. 6, 1995, describes a report generation system and method wherein a secondary report can be generated containing detailed information concerning a specific data element of a primary report. A user selects a data element on a primary report; upon activation, a secondary report is generated, using new parameters determined by the particular data element selected by the user.

Yuen's technique, and similar techniques, offer limited functionality as to the type(s) of secondary report that can be generated, and as to the degree of user control of the nature and format of the secondary report. In general, such techniques generate a single type of secondary report based solely on the user's selection of a particular data element. The user is not generally able to interactively select among a plurality of available secondary reports or visualizations directly from the primary report.

SUMMARY

According to various embodiments of the present invention, a user interface is provided—for a computer or other electronic device that displays quantitative data in graphical form—which allows a user to dynamically invoke and control the display of secondary data visualizations based on a selected element of a primary data visualization. In at least one embodiment, previews of these secondary data visualizations are presented in response to user interaction with the primary visualization. In response to user input, one or more of the previews can be dynamically expanded. This allows a user to dynamically "drill down" into selected aspects and/or elements of the primary data visualization, in a manner that is highly user-configurable, interactive, and responsive.

In at least one embodiment, the system and method of the present invention are implemented in such a manner as to respond to direct manipulation of the displayed elements, for example via a touch-sensitive screen. Any touch-sensitive, proximity-sensitive, or gesture-based system can be used. Known gestures such as pinching and rotating can be interpreted in an intuitive manner to provide improved control and feedback in response to user input.

For example, in at least one embodiment, a gesture including a two-finger spreading motion invokes previews of available secondary visualizations for a given element of a displayed primary visualization. The position at which the gesture is performed specifies which data element of the primary visualization is being explored. The axis defined by the two points of contact determines which of the displayed previews of secondary visualizations is to be highlighted and/or expanded; the user can rotate his or her fingers to change the axis and thereby highlight and/or expand different secondary visualizations. In at least one embodiment, the user can tap on a displayed preview to expand it, or can increase the distance between the spread fingers, or perform some other action to cause the displayed preview to be expanded.

As described in more detail herein, in various embodiments, a hierarchy of visualizations can be established, and the user can navigate among primary, secondary, tertiary, and/or additional levels of visualizations in a similar interactive manner. The system and method of the present invention thereby provide an improved level of user control and interactivity in the display of visualizations on an electronic device.

For purposes of the description herein, the terms "report", "data visualization", "visualization", and "graph" are used interchangeably to refer to any suitable representation or representations of quantitative data, with the examples depicted and described herein being provided for illustrative purposes with no intention of limiting the invention to those particular types of visualizations. Such representations can be graphical, tabular, text-based, or any combination thereof.

Further details and variations are described herein.

BRIEF DESCRIPTION OF THE DRAWINGS

The accompanying drawings illustrate several embodiments of the invention. Together with the description, they serve to explain the principles of the invention according to the embodiments. One skilled in the art will recognize that the particular embodiments illustrated in the drawings are merely exemplary, and are not intended to limit the scope of the present invention.

DETAILED DESCRIPTION OF THE EMBODIMENTS

System Architecture

According to various embodiments, the present invention can be implemented on any electronic device equipped to receive, store, and present quantitative data. Such an electronic device may be, for example, a desktop computer, laptop computer, smartphone, tablet computer, or the like.

Although the invention is described herein in connection with an implementation in a computer, one skilled in the art will recognize that the techniques of the present invention can be implemented in other contexts, and indeed in any suitable device capable of presenting quantitative data graphically and/or interactively. Accordingly, the following description is intended to illustrate various embodiments of the invention by way of example, rather than to limit the scope of the claimed invention.

Figure 1A:
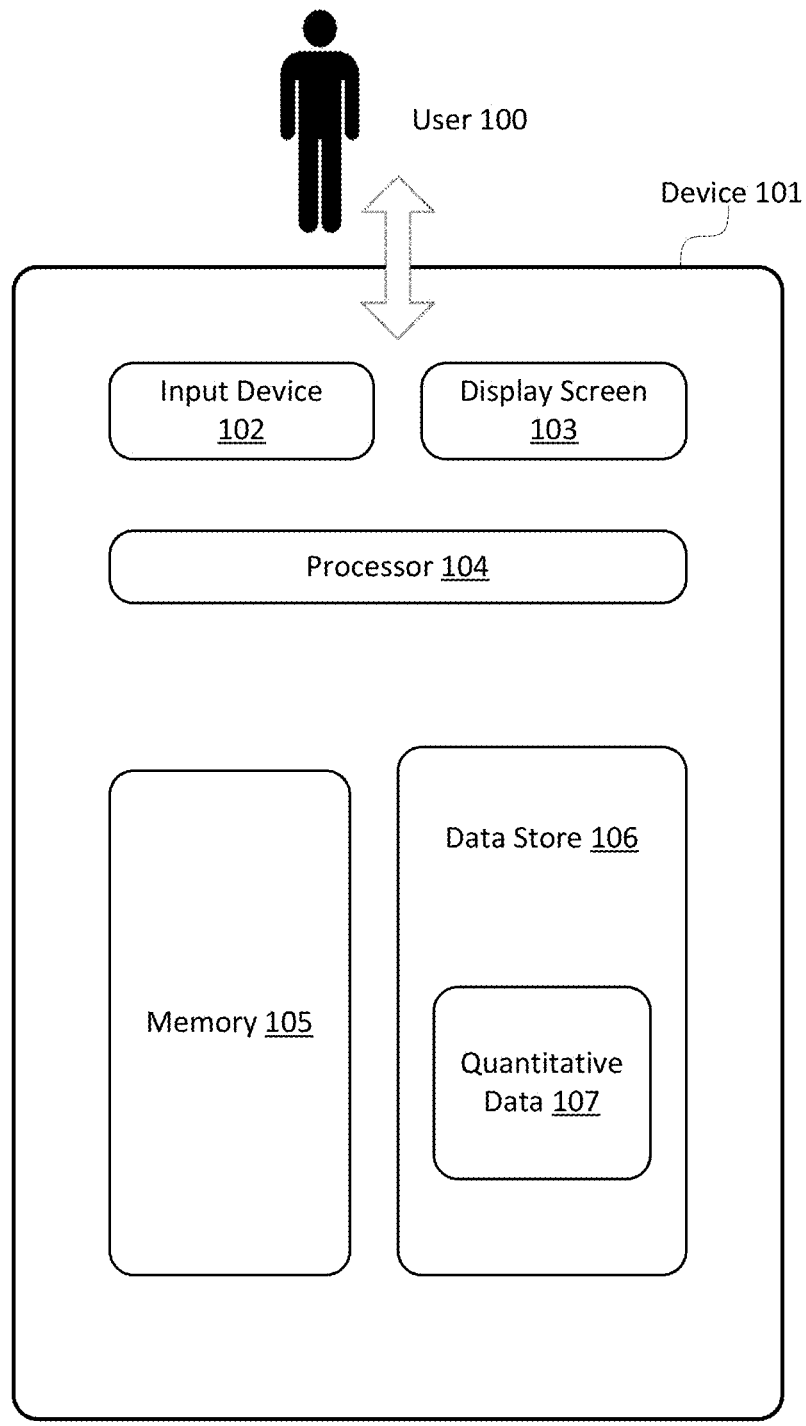
FIG. 1A is a block diagram depicting a hardware architecture for practicing the present invention according to one embodiment of the present invention.

Referring now to FIG. 1A, there is shown a block diagram depicting a hardware architecture for practicing the present invention, according to one embodiment. Such an architecture can be used, for example, for implementing the techniques of the present invention in a computer or other device 101. Device 101 may be any electronic device equipped to receive, store, and present quantitative data, and to receive user input in connect with such quantitative data.

In at least one embodiment, device 101 has a number of hardware components well known to those skilled in the art. Input device 102 can be any element that receives input from user 100, including, for example, a keyboard, mouse, stylus, touch-sensitive screen (touchscreen), touchpad, trackball, accelerometer, five-way switch, microphone, or the like. Input can be provided via any suitable mode, including for example, one or more of: pointing, tapping, typing, dragging, and/or speech. Display screen 103 can be any element that graphically displays quantitative data.

Processor 104 can be a conventional microprocessor for performing operations on data under the direction of software, according to well-known techniques. Memory 105 can be random-access memory, having a structure and architecture as are known in the art, for use by processor 104 in the course of running software.

Data store 106 can be any magnetic, optical, or electronic storage device for data in digital form; examples include flash memory, magnetic hard drive, CD-ROM, DVD-ROM, or the like. In at least one embodiment, data store 106 stores information describing quantitative data 107.

Data store 106 can be local or remote with respect to the other components of device 101. In at least one embodiment, device 101 is configured to retrieve data from a remote data storage device when needed. Such communication between device 101 and other components can take place wirelessly, by Ethernet connection, via a computing network such as the Internet, or by any other appropriate means. This communication with other electronic devices is provided as an example and is not necessary to practice the invention.

In at least one embodiment, data store 106 is detachable in the form of a CD-ROM, DVD, flash drive, USB hard drive, or the like. Quantitative data 107 can be entered into such a detachable data store 106 from a source outside of device 101 and later displayed after data store 106 is connected to device 101. In another embodiment, data store 106 is fixed within device 101.

Figure 1B:
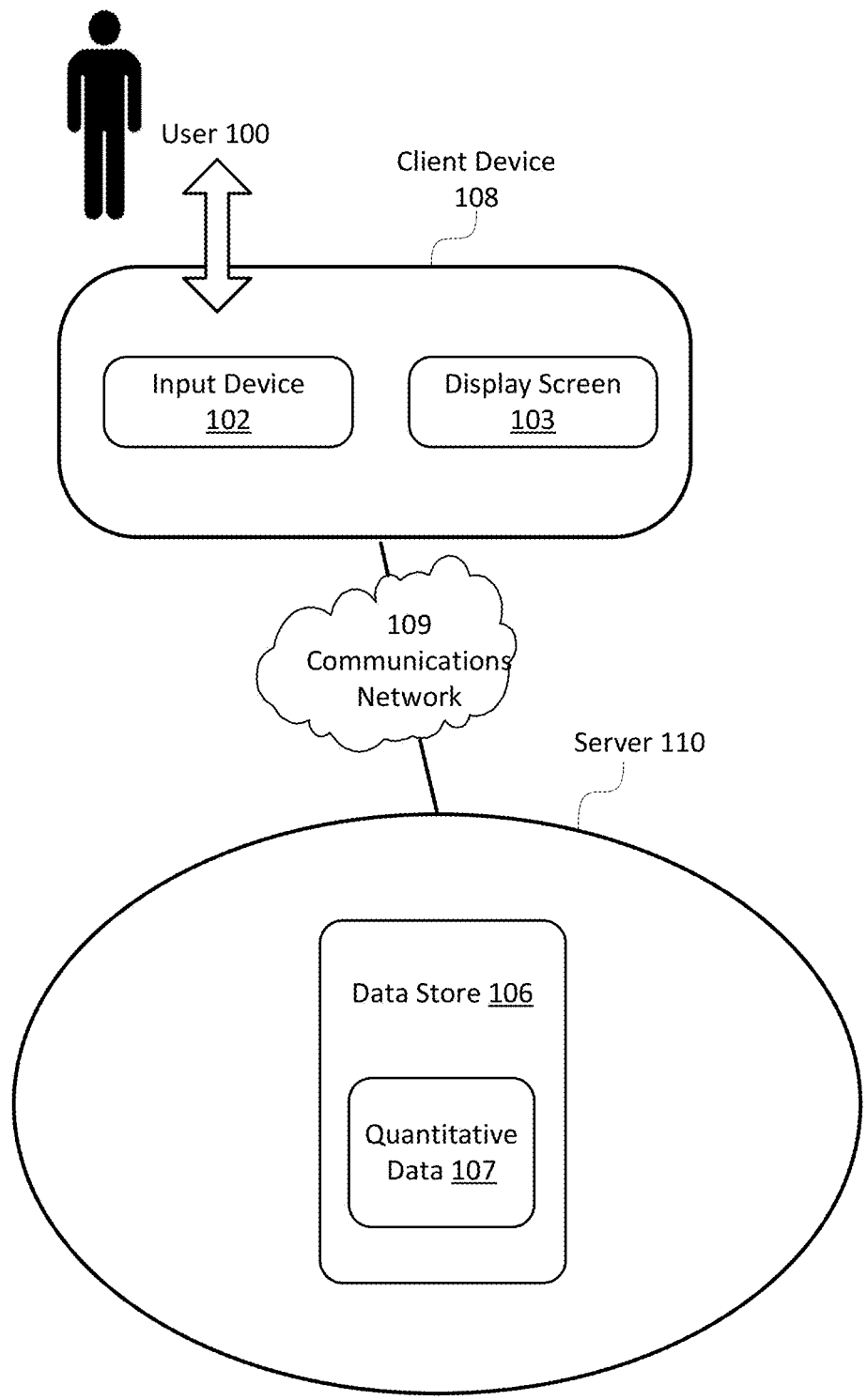
FIG. 1B is a block diagram depicting a hardware architecture for practicing the present invention in a client/server environment, according to one embodiment of the present invention.

Referring now to FIG. 1B, there is shown a block diagram depicting a hardware architecture for practicing the present invention in a client/server environment, according to one embodiment of the present invention. Such an implementation may use a "black box" approach, whereby data storage and processing are done completely independently from user input/output. An example of such a client/server environment is a web-based implementation, wherein client device 108 runs a browser that provides a user interface for interacting with web pages and/or other web-based resources from server 110. Data visualizations can be presented as part of such web pages and/or other web-based resources, using known protocols and languages such as HyperText Markup Language (HTML), Java, JavaScript, and the like.

Client device 108 can be any electronic device incorporating input device 102 and display screen 103, such as a desktop computer, laptop computer, personal digital assistant (PDA), cellular telephone, smartphone, music player, handheld computer, tablet computer, kiosk, game system, or the like. Any suitable communications network 109, such as the Internet, can be used as the mechanism for transmitting data between client 108 and server 110, according to any suitable protocols and techniques. In addition to the Internet, other examples include cellular telephone networks, EDGE, 3G, 4G, long term evolution (LTE), Session Initiation Protocol (SIP), Short Message Peer-to-Peer protocol (SMPP), SS7, WiFi, Bluetooth, ZigBee, Hypertext Transfer Protocol (HTTP), Secure Hypertext Transfer Protocol (SHTTP), Transmission Control Protocol/Internet Protocol (TCP/IP), and/or the like, and/or any combination thereof. In at least one embodiment, client device 108 transmits requests for data via communications network 109, and receives responses from server 110 containing the requested data.

In this implementation, server 110 is responsible for data storage and processing, and incorporates data store 106 for storing quantitative data 107. Server 110 may include additional components as needed for retrieving data from data store 106 in response to requests from client device 108.

In at least one embodiment, quantitative data 107 is organized into one or more well-ordered data sets, with one or more data entries in each set. Data store 106, however, can have any suitable structure. Accordingly, the particular organization of quantitative data 107 within data store 106 need not resemble the form in which it is displayed to user 100. In at least one embodiment, an identifying label is also stored along with each data entry, to be displayed along with each data entry.

Quantitative data can be retrieved from client-based or server-based data store(s), and/or from any other source. In at least one embodiment, input device 102 is configured to receive data entries from user 100, to be added to quantitative data 107 held in data store 106. User 100 may provide such data entries via the hardware and software components described above according to means that are well known to those skilled in the art.

Display screen 103 presents one or more data visualizations that present quantitative data 107 in some visual form, whether text-based, tabular, graphical, interactive, and/or any other suitable format. Such data visualizations may, for example, take the form of bar graphs or other visual graphs that present all of, or some subset of, quantitative data 107. In at least one embodiment where only some of quantitative data 107 is presented at a time, a dynamic control, such as a scrolling mechanism, may be available via input device 102 to change which data entries are currently displayed, and/or to alter the manner in which the data is displayed.

In at least one embodiment, data visualizations presented via display screen 103 include visual cues, such as height, distance, and/or area, to convey the value of each data entry. In at least one embodiment, labels accompany data entries on display screen 103, or can be displayed when user 100 taps on or clicks on a data entry, or causes an onscreen cursor to hover over a data entry.

Method

As described in more detail herein, various embodiments of the present invention provide techniques for dynamically expanding aspects of displayed data visualizations in an interactive manner, such as for example in response to user input.

Figure 2A:
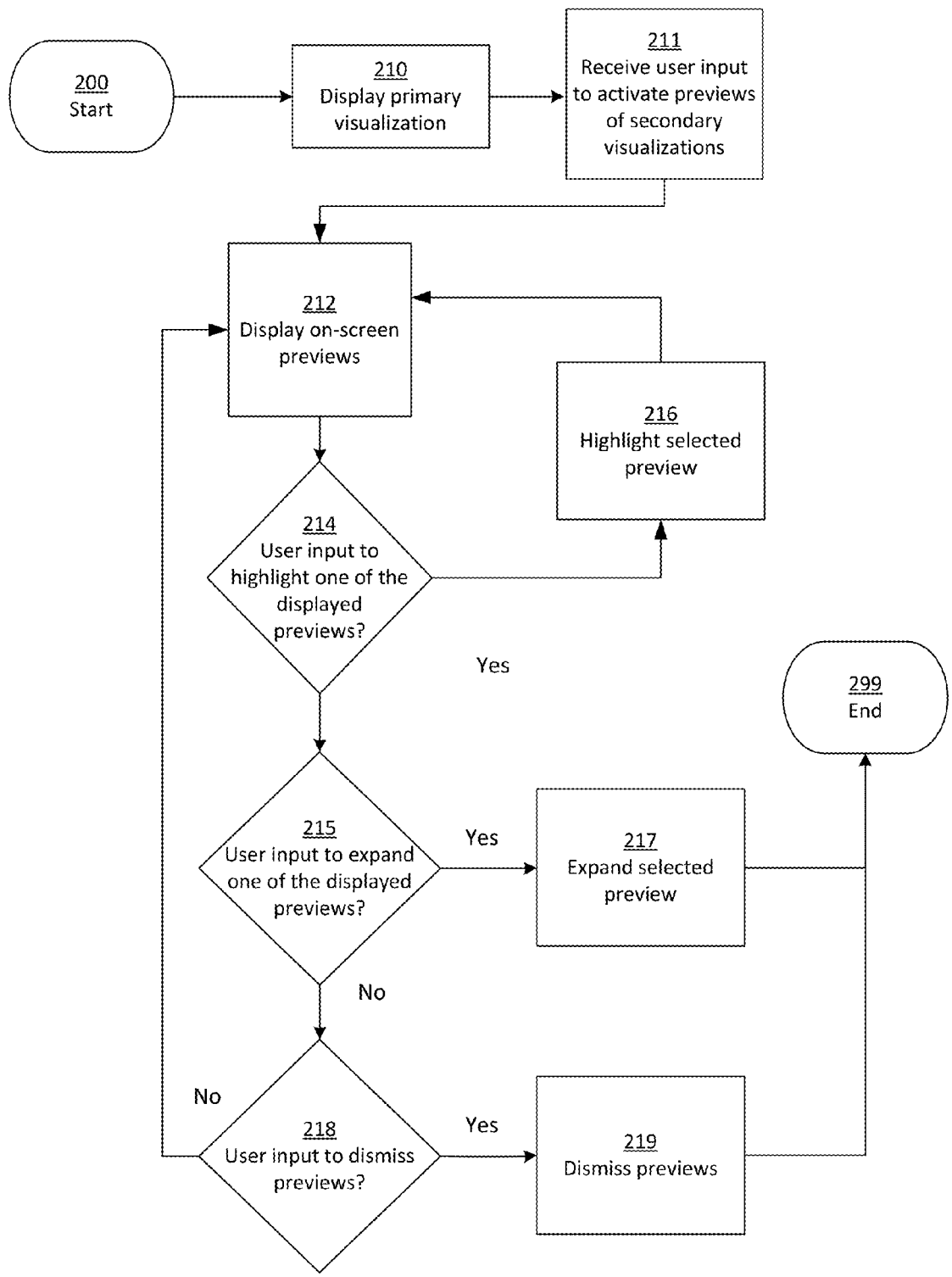
FIG. 2A is a flowchart depicting a method of dynamically expanding a data visualization in response to user input, according to one embodiment of the present invention.

Referring now to FIG. 2A, there is shown a flowchart depicting a method of dynamically expanding a data visualization in response to user input, according to one embodiment of the present invention. Referring also to FIGS. 3 through 10, there is shown a series of screen shots illustrating an example of dynamic expansion of a bar graph data visualization in response to user input, according to one embodiment of the present invention. Although the example of FIGS. 3 through 10 will be used to illustrate the method of FIG. 2A, one skilled in the art will recognize that the particular depictions in the example are merely provided for illustrative purposes, and that the invention can be implemented using other techniques and mechanisms without departing from the essential characteristics of the invention as set forth in the claims.

Figure 3:
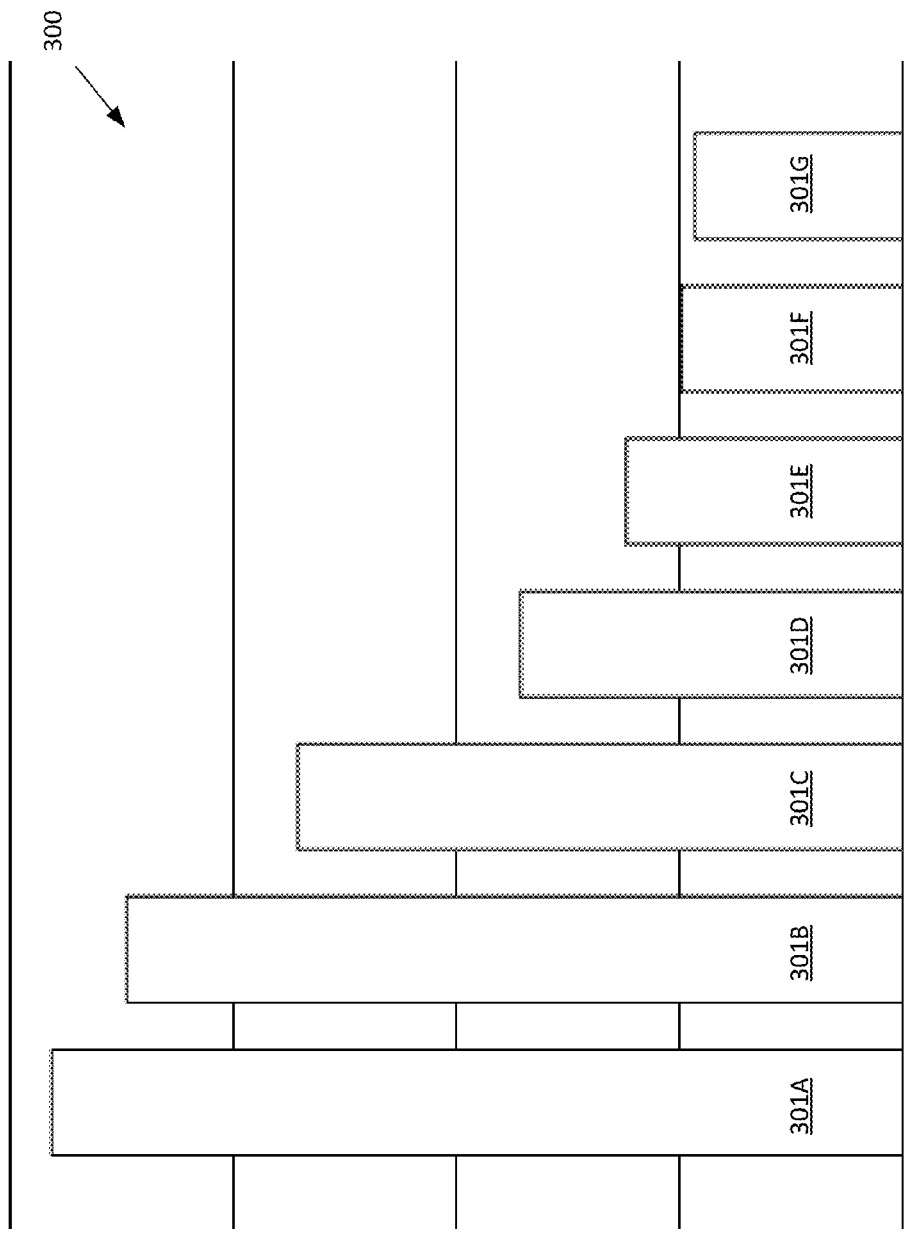
FIGS. 3 through 10 are a series of screen shots illustrating an example of dynamic expansion of a bar graph data visualization in response to user input, according to one embodiment of the present invention.

A primary visualization is displayed 210. The primary visualization can be any representation of quantitative data 107, such as a graph, table, chart, and/or the like. FIG. 3 depicts an en example of a primary visualization in the form of a bar graph 300. Bar graph 300 includes a number of rectangles 301A-301G, each representing a value corresponding to a data entry. For example, the height of each rectangle 301 can indicate the value of the corresponding data entry. Bar graph 300 can include labels to indicate the scale of the vertical axis, and to identify each of the rectangles 301A-301G as being associated with a point in time or some other relevant data category. Such labels are not shown in the examples presented herein.

According to various embodiments, user 100 can interact with the primary visualization in any of a number of different ways. In at least one embodiment, display screen 103 is a touch-sensitive screen, allowing user 100 to interact with the primary visualization by touching the screen or causing a stylus or other object to touch the screen. In at least one embodiment, user 100 can move an on-screen cursor, via an input device 102 such as a mouse, trackball, touchpad, keyboard, five-way switch, and/or any other suitable device, to point to and interact with various areas of the primary visualization. Such interactions may include resizing, moving, scrolling, and/or reformatting the primary visualization, and/or performing any other type of operation in connection with the visualization.

In at least one embodiment, user 100 can provide input causing one or more secondary visualization(s) to be displayed. Such secondary visualization(s) may provide more details regarding a particular aspect or element of the primary visualization (such as a rectangle 301 of graph 300), and/or they may present data in a different form than the primary visualization. For example, a secondary visualization may depict the same or similar data as that displayed in the first visualization, but displayed according to a different dimension or in a different format or scale. As another example, a secondary visualization may depict a subset or superset of the data displayed in the first visualization.

As an example, a primary data visualization may depict total yearly sales. Secondary visualizations associated with such a primary visualization may include total yearly sales subdivided by various categories such as:
  Total yearly sales by salesperson
  Total yearly sales by sales channel
  Total yearly sales by product line
  Total yearly sales by industry
  Total yearly sales by marketing campaign
  Total yearly sales by customer role In at least one embodiment, the input to activate a secondary visualization may include, for example, tapping or clicking on a particular element of the primary visualization, or activating a keyboard command, or any other suitable technique. The position at which such input is provided may determine the particular aspect of the primary visualization to be expanded or presented in the secondary visualization, and/or it may determine the format and/or nature of the secondary visualization. For example, tapping on a particular rectangle 301 may cause secondary visualization(s) associated with a corresponding data value to be made available.

In at least one embodiment, a set of previews of available secondary visualizations can be presented, to allow user 100 to select a desired secondary visualization more intelligently, and to give user 100 a sense of what kind of secondary visualizations are available. Accordingly, in response to receiving 211 user input to activate previews of secondary visualizations, previews are displayed 212. In the example described above, previews could be displayed for the various visualizations depicting total yearly sales subdivided by the above-listed categories.

Any suitable form of input can be provided for activating previews of available secondary visualizations. In one example, a pinch gesture is used, as described in more detail herein. Alternatively, input for activating previews of available secondary visualizations can be provided in the form of tapping, gesturing, clicking, keyboard input, interaction with on-screen buttons or links, and/or the like. Voice command can also be used.

The position at which the user's input is provided may determine which previews are displayed; for example, tapping on a particular rectangle 301 may activate display of previews for secondary visualization(s) associated with a data value corresponding to that rectangle 301.

Figure 4:
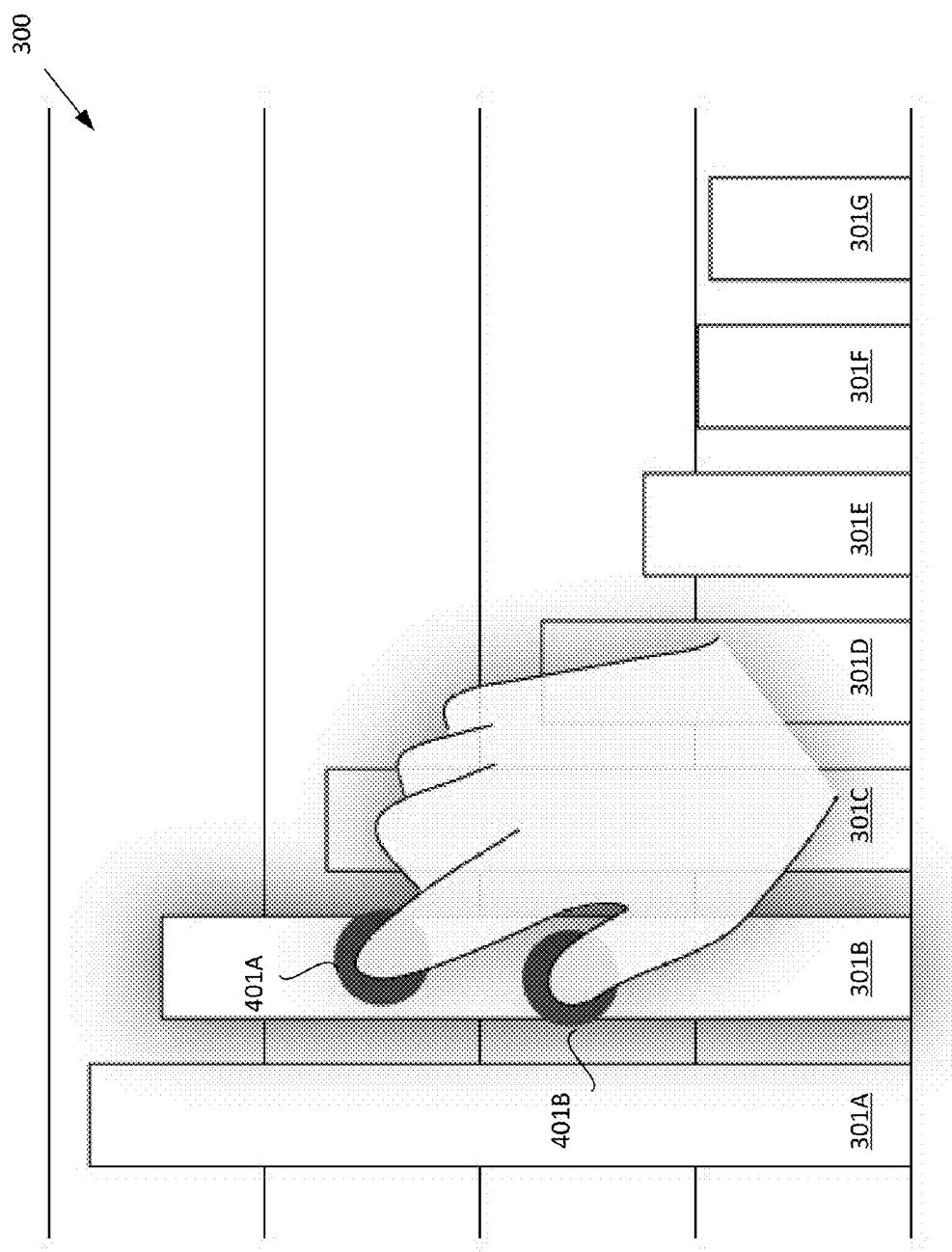
Figure 5:
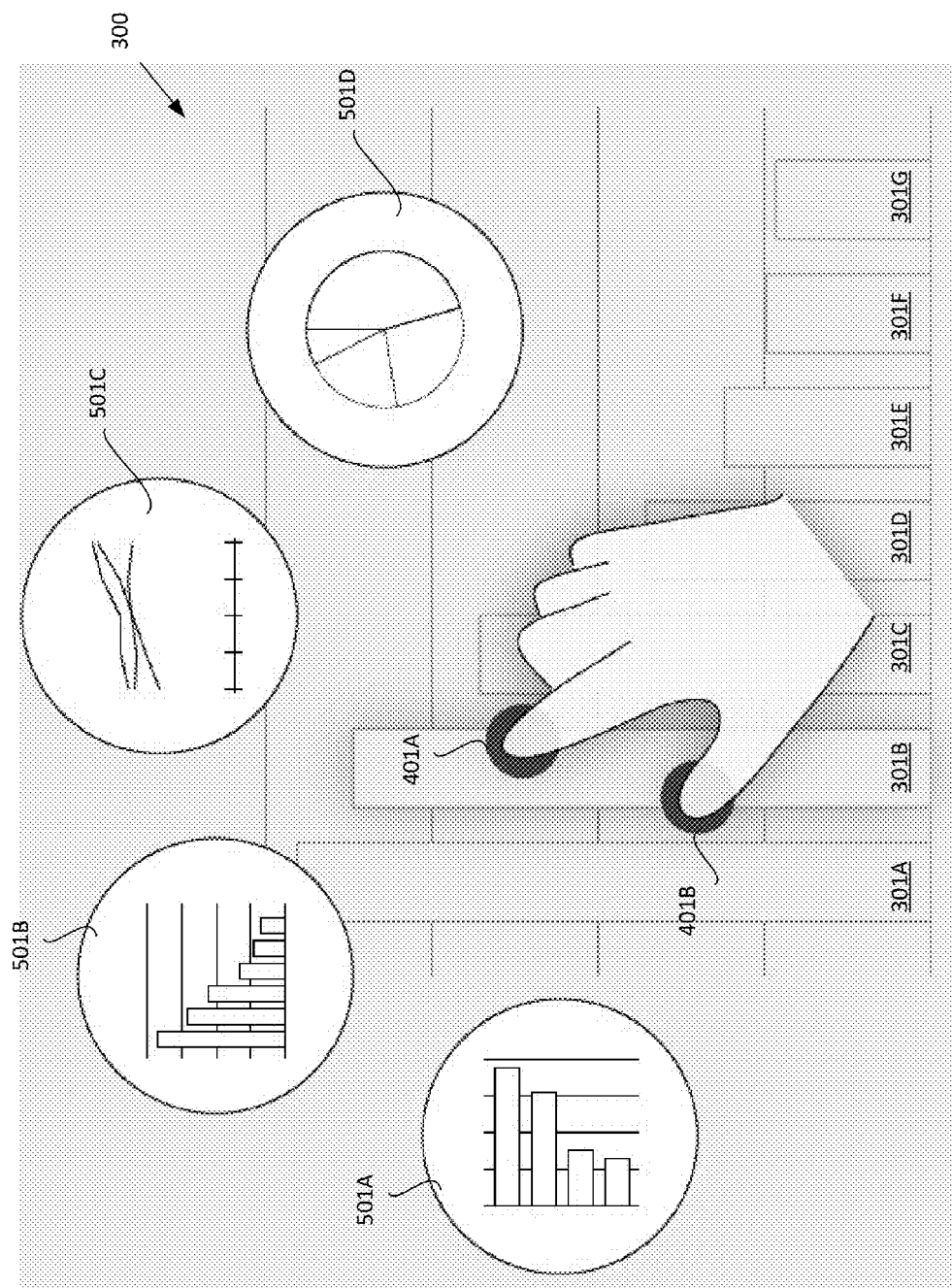

In at least one embodiment, user 100 performs some sort of gesture to activate previews of secondary visualizations, wherein the gesture is detected by input device 102 and/or by a touch-sensitive display screen 103. For example as depicted in FIG. 4, in embodiments wherein display screen 103 is a touch-sensitive screen capable of detecting two or more points of contact, user 100 can activate previews of secondary visualizations by performing a pinch-to-zoom gesture (moving two fingers farther apart from one another while both fingers are touching display screen 103). As depicted in FIGS. 4 and 5, there are two points of contact 401A, 401B; spreading these points 401A, 401B apart by movement of user's 100 fingers causes previews 501A-501D to be displayed. In another embodiment, spreading the fingers may not be required; previews may be activated, for example, by any or all of the following:
  touching the screen (activates previews corresponding to the element being displayed at the contact point);
  touching the screen with at least two fingers (activates previews corresponding to the element being displayed at the contact point or the midpoint between the contact points; also defines an axis that can be used to select a displayed preview, as discussed below; pinch gesture not required);

causing a cursor to hover at a certain location on the screen (activates previews corresponding to the element being displayed at the hover location);

clicking a mouse or performing some other activation command while a cursor is at a certain location on the screen (activates previews corresponding to the element at the location);

entering a keyboard command indicating a location on the screen (activates previews corresponding to the element at the location).

In at least one embodiment, the on-screen location of the input (for example the position of contact points 401A, 401B, or the midpoint between contact points 401A, 401B) determines which portion of the displayed data is to be expanded by presentation of secondary visualizations. Accordingly, in the example of FIG. 5, the four previews 501A-501D depict available secondary visualizations that relate to rectangle 301B, since the initial contact points 401A, 401B correspond to rectangle 301B. In addition, as shown in FIGS. 4 and 5, the particular data element to which the previews 501A-501D relate (in this case, rectangle 301B), can be highlighted or otherwise visually distinguished.

Previews 501 can take any suitable form. For example, as shown in FIG. 5, each preview 501 can be a miniature schematic representation of a type of data visualization that relates to the selected element of the primary data visualization. In this example, each preview 501 depicted in FIG. 5 is a miniature schematic representation of a different type of visualization that relates to the data represented by bar 301B.

In at least one embodiment, previews 501 for all available secondary visualizations are displayed. In at least one embodiment, previews 501 for a subset of available secondary visualizations are shown, for example if there are too many available secondary visualizations to effectively display previews 501 for all of them. The display may scroll through available visualizations, or may present only the most popular or suitable ones, or provide some mechanism for the user 100 to view previews other than those initially displayed. In at least one embodiment, a hierarchy of previews may be established, allowing user 100 to more easily navigate to the one he or she is interested in; such a technique is described in more detail below.

Figure 6:
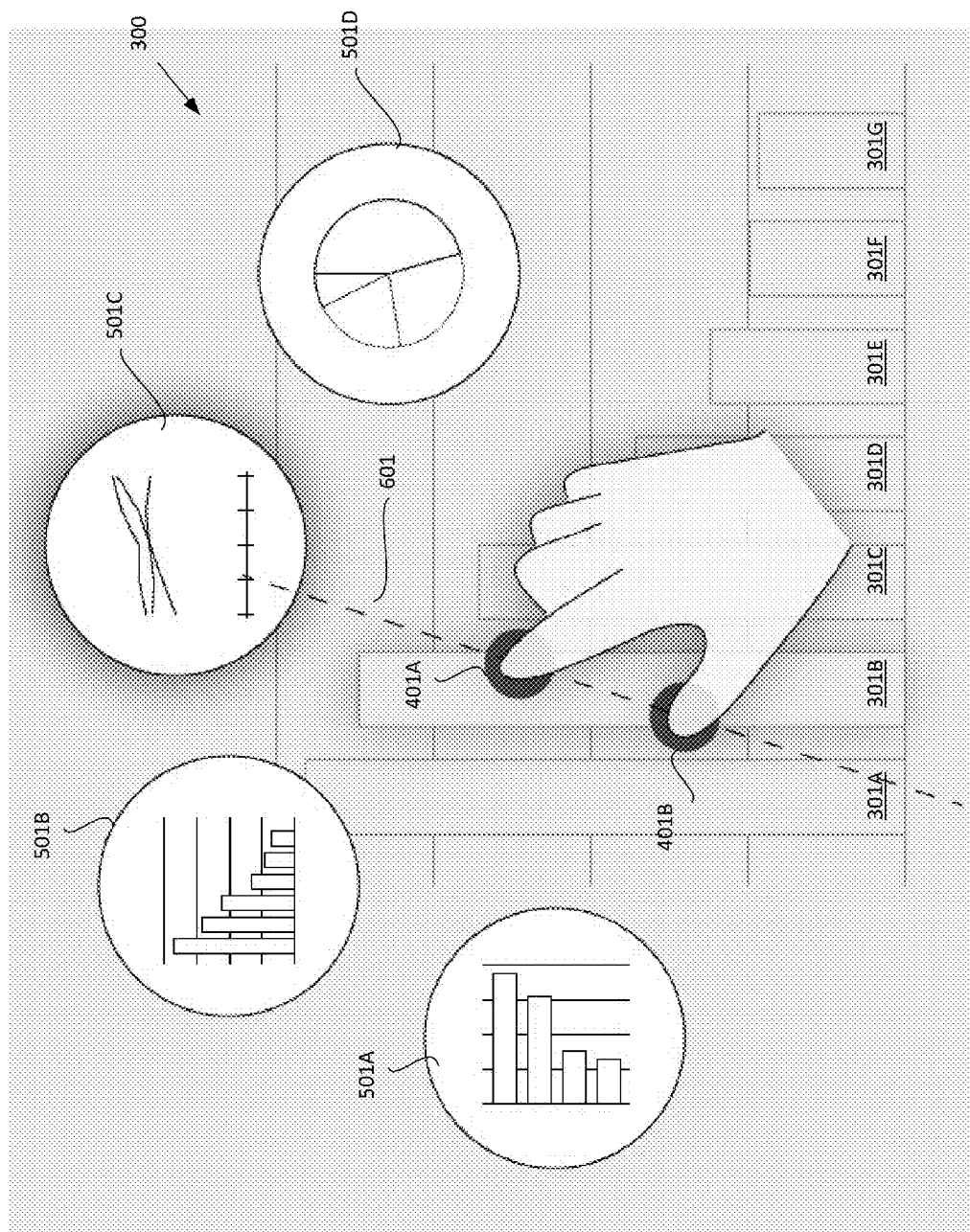

In at least one embodiment, user 100 can provide input 214 to cause one of the displayed previews 501 to be highlighted; the selected preview is highlighted 216. For example, user 100 may tap on one of the displayed previews 501 to cause it to be highlighted. Alternatively, user 100 may rotate the axis of the pinch gesture to cause different previews 501 to be highlighted. For example, as depicted in FIG. 6, axis 601 drawn between contact points 401A and 401B determines which preview 501 to highlight; in this case, preview 501C is highlighted. In at least one embodiment, axis 601 is not actually displayed, but is shown in FIG. 6 merely for illustrative purposes; in another embodiment, axis 601 is displayed.

Figure 7:
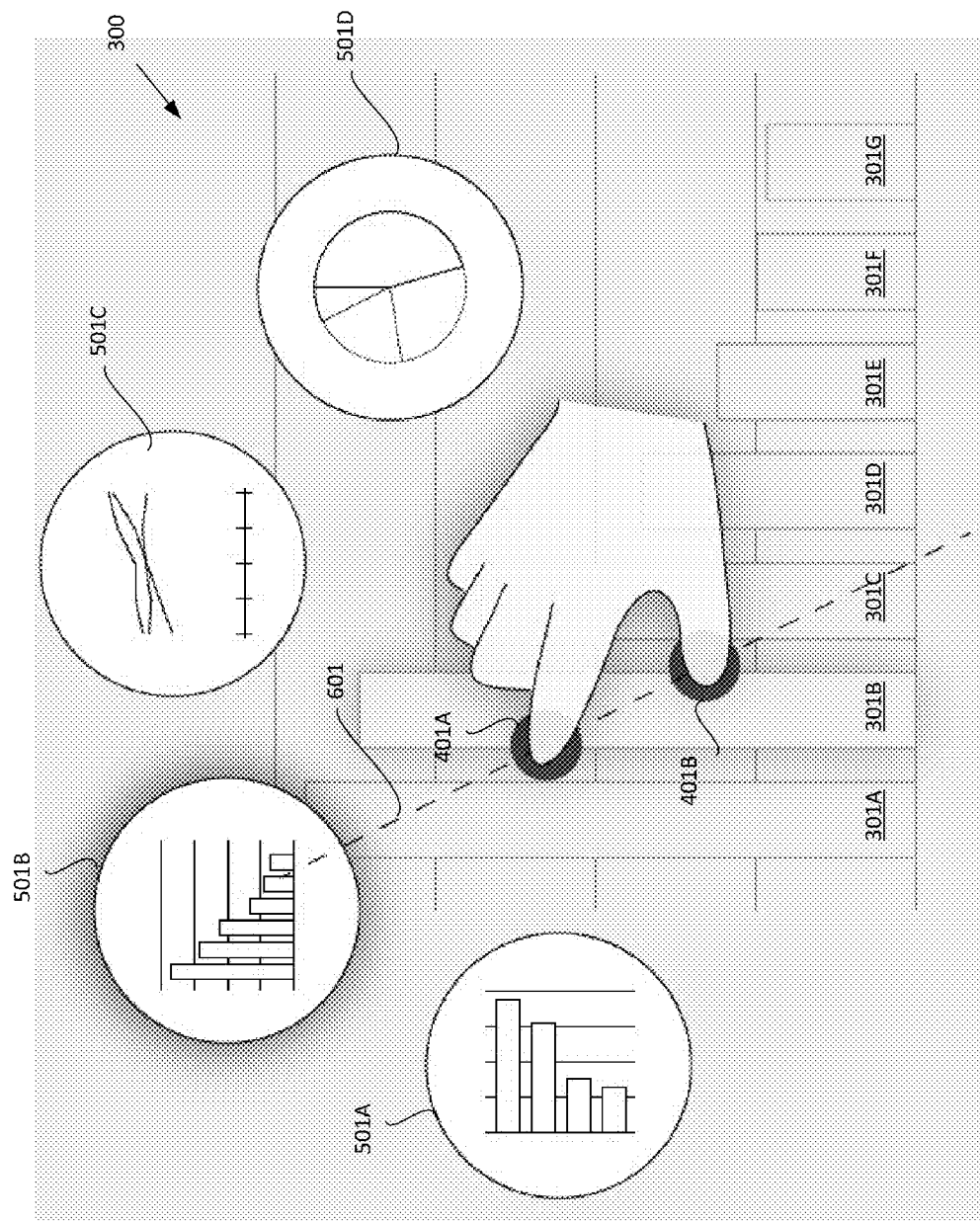

In FIG. 7, user 100 has rotated his or her fingers, causing contact points 401A, 401B to shift position. Axis 601 now points to preview 501B, so that preview is now highlighted.

Figure 8:
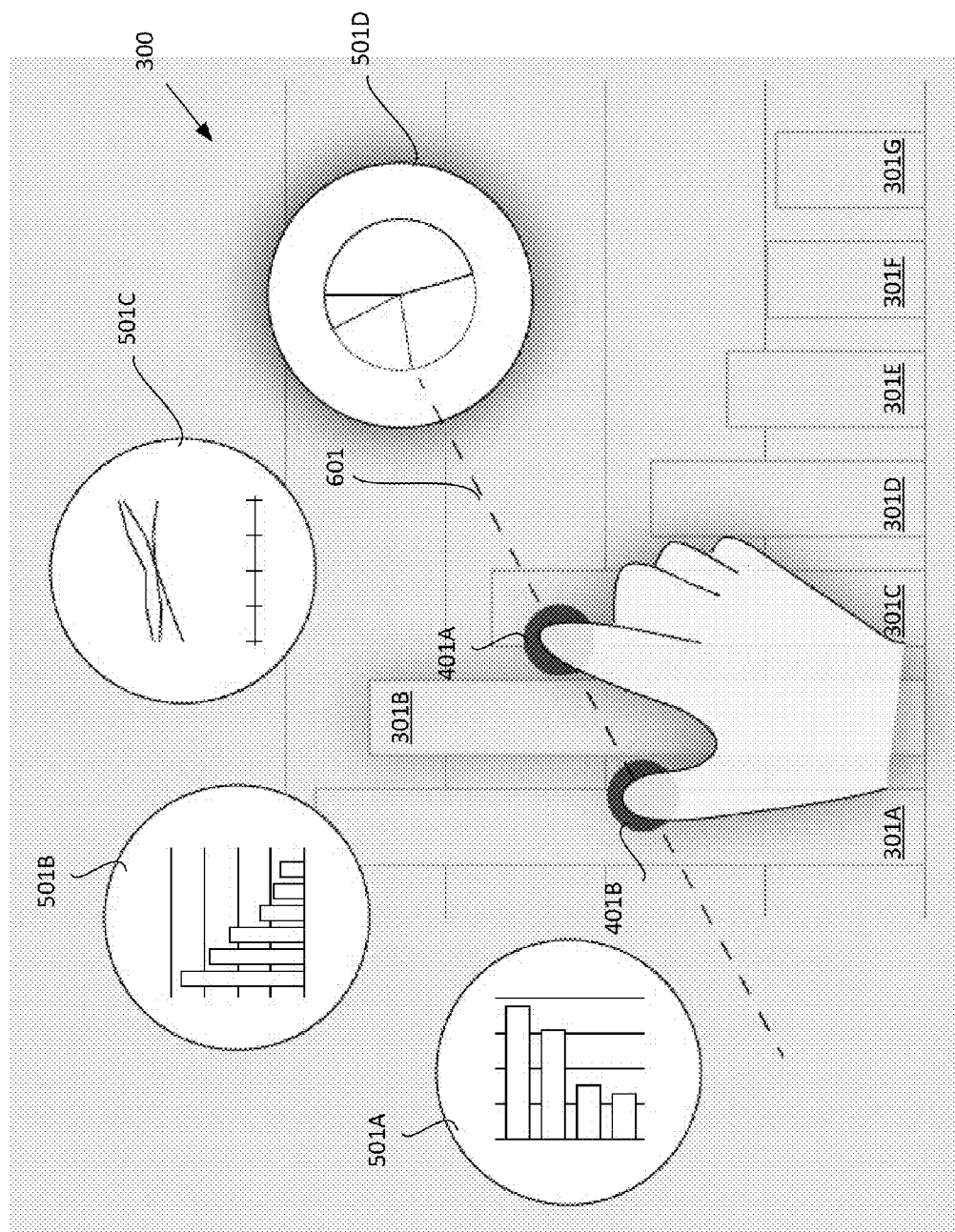

In FIG. 8, user 100 has rotated his or her fingers, causing contact points 401A, 401B to shift position. Axis 601 now points to preview 501D, so that preview is now highlighted.

Highlighted preview 501 can be displayed in any visually distinctive manner. For example, it can be brightened, shown in color (while other previews 501 are black-and-white), enlarged, and/or made dynamic; any other suitable effect may be applied. In at least one embodiment, previews 501 initially depict various types of visualizations without actually containing the visualizations themselves; highlighting a preview 501 may cause that preview to go "live", showing actual data based on the currently selected element of the primary visualization. In at least one embodiment, highlighting a preview 501 causes that preview to be selected for further operations, such as hierarchical navigation, configuration, naming, modification, deletion, and/or the like.

In at least one embodiment, when previews 501 are displayed, the primary visualization is temporarily dismissed, grayed out, blurred, and/or shown in a subdued manner.

In at least one embodiment, additional information may be displayed for a selected preview 501. For example, a text box, ToolTip, or other element containing descriptive information may be shown for a preview 501 when that preview is selected. The descriptive element can be displayed alongside the selected preview 501, or on top of it (for example, in a translucent manner), or at some other location on the display screen. In another embodiment, an audio description (such as speech) of the selected preview 501 can be output on a speaker or similar component.

In at least one embodiment, if user 100 spreads his or her fingers further apart (or otherwise continues the gesture that caused previews 501 to be activated), all previews 501, or the selected preview 501, can dynamically expand in size. Dynamic resizing of previews 501, or the selected preview 501, can continue in response to further gestures by user 100; for example, previews 501, or the selected preview 501, can change their size dynamically based on the user 100 bringing his or her fingers closer together or farther apart.

In at least one embodiment, user 100 can shift finger position(s) with respect to the primary visualization, while previews 501 are being displayed. If user 100 shifts his or her fingers so that the center point between contact points 401A, 401B moves to a different element of the primary visualization (such as a different rectangle 301), the displayed previews 501 can be dynamically updated to reflect the newly selected element of the primary visualization. For example, if user 100 shifts so that the center point is now on rectangle 301C instead of rectangle 301B, previews 501 are updated so that they now depict available secondary visualizations for rectangle 301C. In at least one embodiment, user 100 can move his or her fingers around screen 103 to cause different elements of the primary visualization to be selected and thereby cause different sets of previews 501 to be displayed. In addition, rotation of the axis between contact points 401A, 401B can continue to dynamically change the selected preview 501.

In embodiments using different input modes, such dynamic updating of previews can be performed in manner suited to the particular input mode being used. For example, appropriate mechanisms for changing the set of displayed previews 501, and/or selecting particular previews 501, can be implemented for various types of input devices 102.

Figure 9:
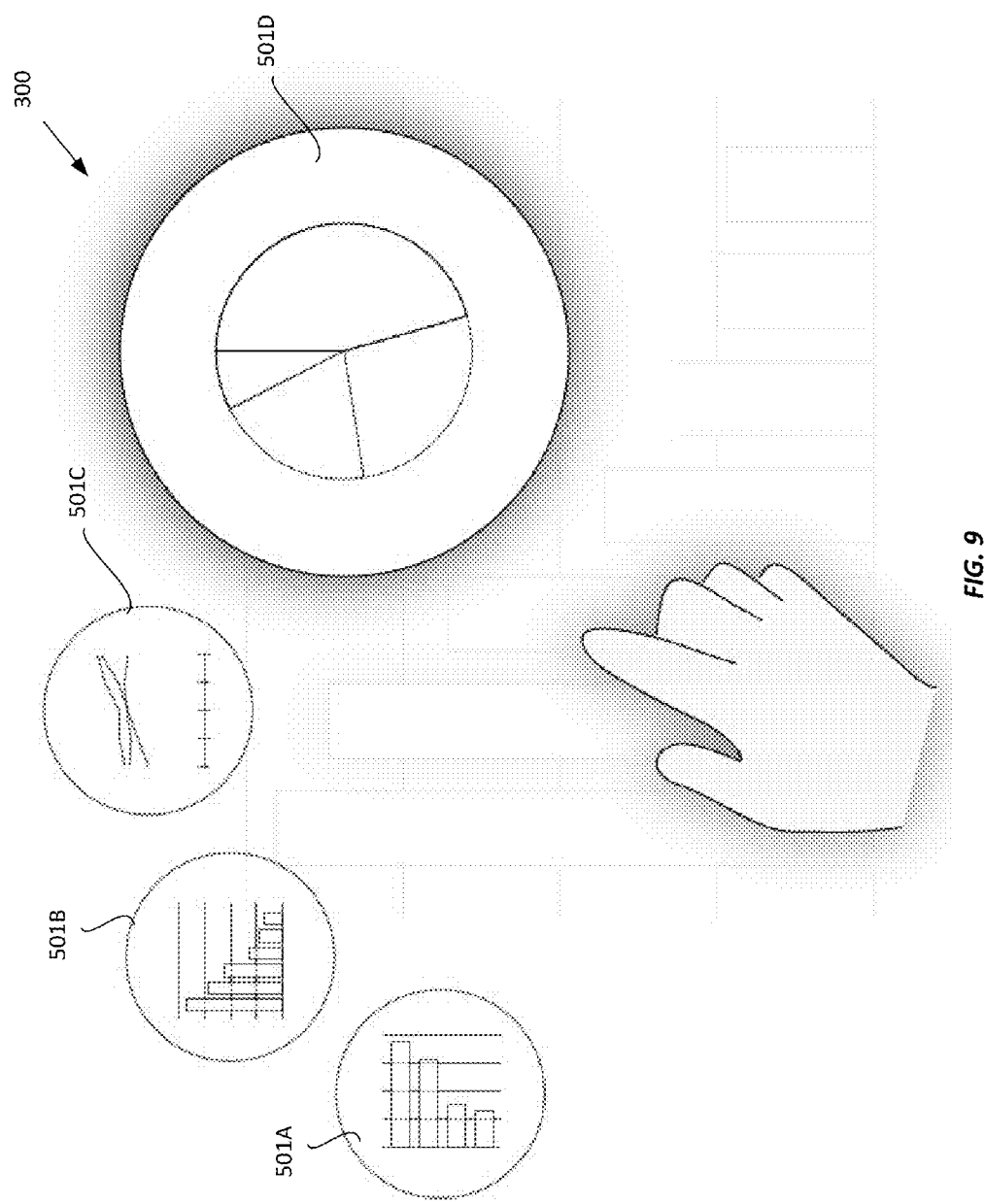
Figure 10:
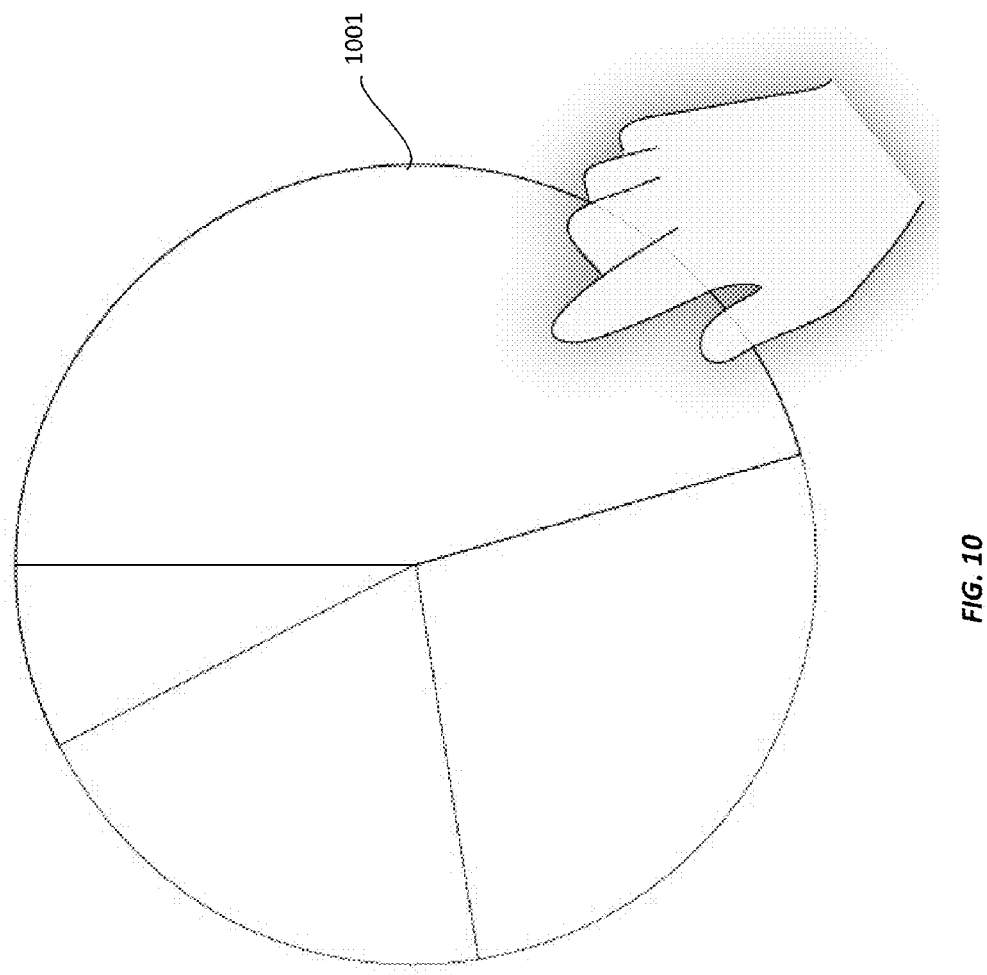
Figure 11:
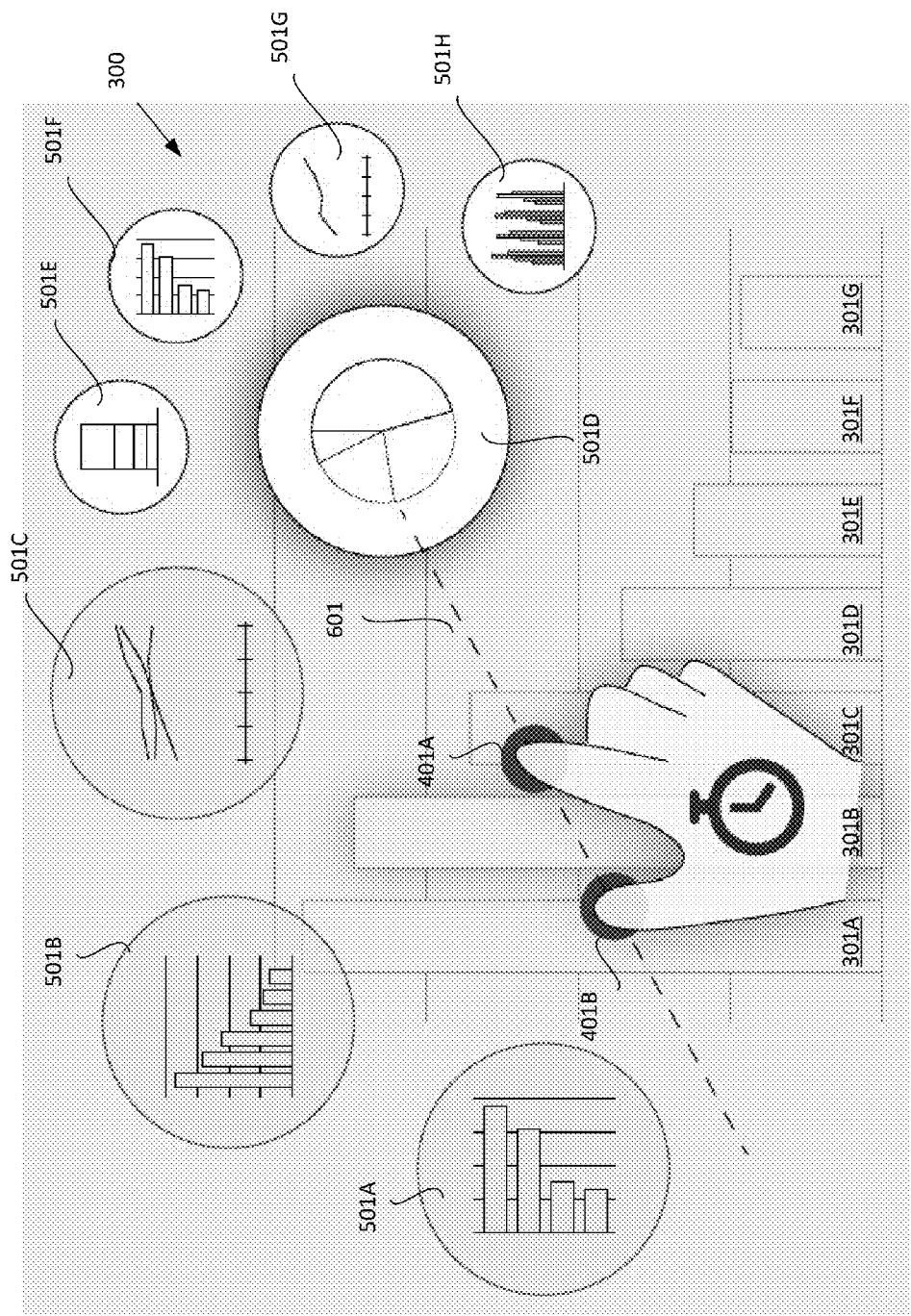
FIGS. 11 through 14 are a series of screen shots illustrating an example of two-level hierarchical expansion of a bar graph data visualization in response to user input, according to one embodiment of the present invention.

In at least one embodiment, user 100 can provide input 215 to cause one of the displayed previews 501 to be expanded; the selected preview is expanded 217. For example, in at least one embodiment, user 100 can remove his or her fingers from screen 103 while a particular preview 501 is selected, to cause that preview 501 to be expanded. Such a technique is depicted in the example of FIGS. 8 to 10. In FIG. 8, user 100 has positioned his or her fingers so that the axis formed by contact points 401A, 401B points to preview 501D, causing that preview 501D to be selected. In FIG. 9, user 100 removes his or her fingers from screen 103; this causes the selected preview 501D to expand. FIG. 10 depicts the completion of the expansion, so that selected preview 501D has transitioned into a full-sized display 1001 of a secondary visualization. Display 1001 may take up all of display screen 103 or some portion of display screen 103. In at least one embodiment, when full-sized display 1001 of a secondary visualization is presented, the primary visualization is dismissed, or subdued, or shown in the background. In at least one embodiment, the expansion of a selected preview 501D into a full-sized display 1001 takes place as a smooth transition. In at least one embodiment, user 100 can interact with the displayed secondary visualization.

In other embodiments, other input mechanisms can be used for invoking expansion of a preview 501. For example, user 100 can tap on or click on a displayed preview 501 to cause it to be expanded 217. Alternatively, user 100 can hit a key, click a mouse, or perform some other input operation to cause a displayed or selected 501 preview to be expanded 217.

Any suitable mechanism can be provided for causing dismissal of full-sized display 1001 of the secondary visualization. For example, user 100 may tap on the secondary visualization to dismiss it or to cause it to transition back to preview form. Alternatively, user 100 can click on a dismiss button, or hit a key, or perform some other input operation to cause the secondary visualization to be dismissed. In at least one embodiment, user 100 can interact with the secondary visualization, for example to perform additional operations to view and/or manipulate various aspects and elements of the secondary visualization in different ways.

In at least one embodiment, while previews 501 are displayed, user 100 can provide input 218 to cause the displayed previews 501 to be dismissed; in response, previews 501 are dismissed 219, and the original form of primary visualization 300 is restored. Any suitable input can be provided for causing such dismissal 219. For example, user 100 can tap on an area of screen 103, or click on a dismiss button, or hit a key, or perform some other input operation to cause previews 501 to be dismissed.

Hierarchy of Visualizations

In at least one embodiment, available secondary visualizations can be organized in a hierarchy. The user can navigate the hierarchy to find and select a particular visualization for viewing and/or activation. The hierarchy can be organized according to any suitable scheme, such as by data type, format, style, and/or the like. Any number of levels can be available within the hierarchy.

Any suitable mechanism can be provided for navigating the hierarchy of visualizations. In at least one embodiment, a hierarchy of previews is made available; a top level can be provided to indicate a particular type of visualization, and subordinate levels of previews can be provided so as to provide the user with information about individual visualizations within the type. In at least one embodiment, so as to avoid cluttering the screen with an excessive number of previews at any given time, each set of second-level previews associated with a particular first-level preview is displayed only when user 100 selects, activates, highlights, or otherwise interacts that corresponding first-level preview. In at least one embodiment, multiple (or all) available sets of second-level previews can be displayed concurrently. In at least one embodiment, user 100 can select which sets of second-level previews should be displayed at any given time. In at least one embodiment, similar techniques can be used for successively lower levels of previews.

Figure 2B:
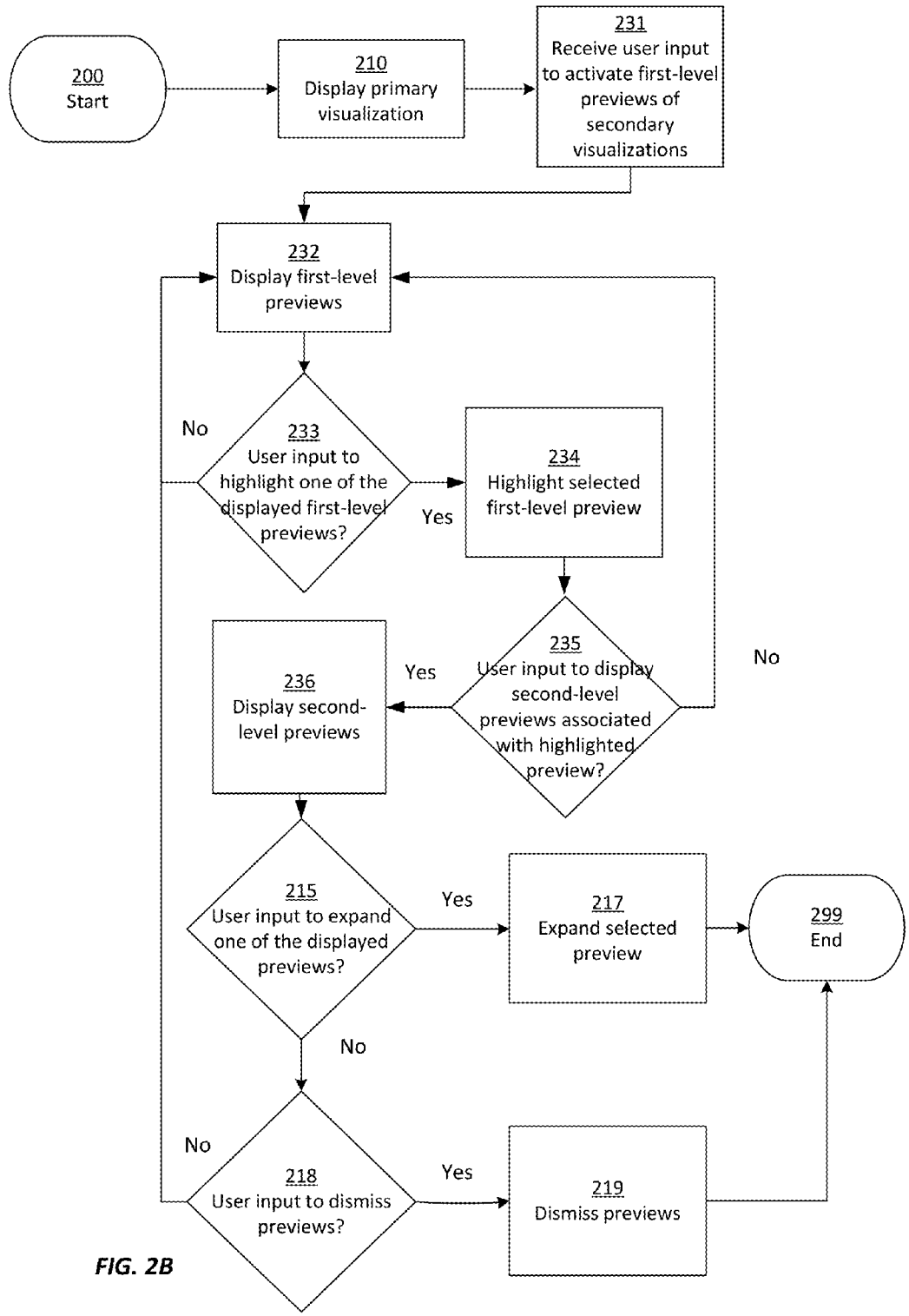
FIG. 2B is a flowchart depicting a method of hierarchical expansion of a data visualization in response to user input, according to one embodiment of the present invention.

Referring now to FIG. 2B, there is shown a flowchart depicting a method of hierarchical expansion of a data visualization in response to user input, according to one embodiment of the present invention. Referring also to FIGS. 11 through 14, there is shown a series of screen shots illustrating an example of two-level hierarchical expansion of a bar graph data visualization in response to user input, according to one embodiment of the present invention.

Although the example of FIGS. 11 through 14 will be used to illustrate the method of FIG. 2B, one skilled in the art will recognize that the particular depictions in the example are merely provided for illustrative purposes, and that the invention can be implemented using other techniques and mechanisms without departing from the essential characteristics of the invention as set forth in the claims.

A primary visualization is displayed 210. In response to receiving 231 user input to activate first-level previews of secondary visualizations, previews are displayed 232. Such display of first-level previews can be performed in a manner similar to that described above in connection with steps 211 and 212 of FIG. 2A.

In at least one embodiment, user 100 can provide input 233 to cause one of the displayed first-level previews to be highlighted; the selected first-level preview is highlighted 234. Such highlighting can be performed in a manner similar to that described above in connection with steps 214 and 216 of FIG. 2A.

In at least one embodiment, user 100 can provide input 235 to cause second-level previews to be displayed for a highlighted first-level preview. In response, second-level previews are displayed 236.

Any suitable mechanism can be used for allowing user 100 to provide input 235 to cause second-level previews to be displayed 236. In the example shown in FIG. 11, second-level previews 501E-H are displayed 236 in response to user 100 holding contact points 401A, 401B relatively steady while a particular first-level preview 501D is displayed. In other embodiments, other trigger actions may cause second-level previews 501E-H to be displayed 236; for example, user 100 can input a command, or tap or double-tap, or perform a gesture, spoken command, or any other input operation to cause second-level previews 501E-H to be displayed.

In the example, only those second-level previews 501E-H associated with the currently selected first-level preview 501D are displayed. If user 100 rotates his or her fingers so that axis 601 no longer points to first-level preview 501D, second-level previews 501E-H are dismissed. One skilled in the art will recognize that other input schemes are possible, including for example a scheme whereby previews are dismissed only upon receipt of explicit input from user 100 to dismiss them.

In the example, selected first-level preview 501D depicts a visualization that is a representative example of a category or type of visualizations. Other visualizations 501E-501H are part of the same category or type. The preview 501D selected for display as a representative example may be selected based on a determination that that visualization is a "best fit" for user's 100 needs, or it can be selected by some other means.

In another embodiment, each first-level preview can instead be an indication of a category or type, rather than a representative example depicting a particular visualization of that category or type; second-level visualizations can belong to the indicated category or type.

In at least one embodiment, the display of second-level previews 501E-501H is persistent; once they are displayed, they remain on the screen to allow user 100 to select among them and/or interact with them. For example, user 100 can drag, tap, click on, or otherwise interact with one of the displayed second-level previews to activate it, causing it to be expanded.

Figure 12:
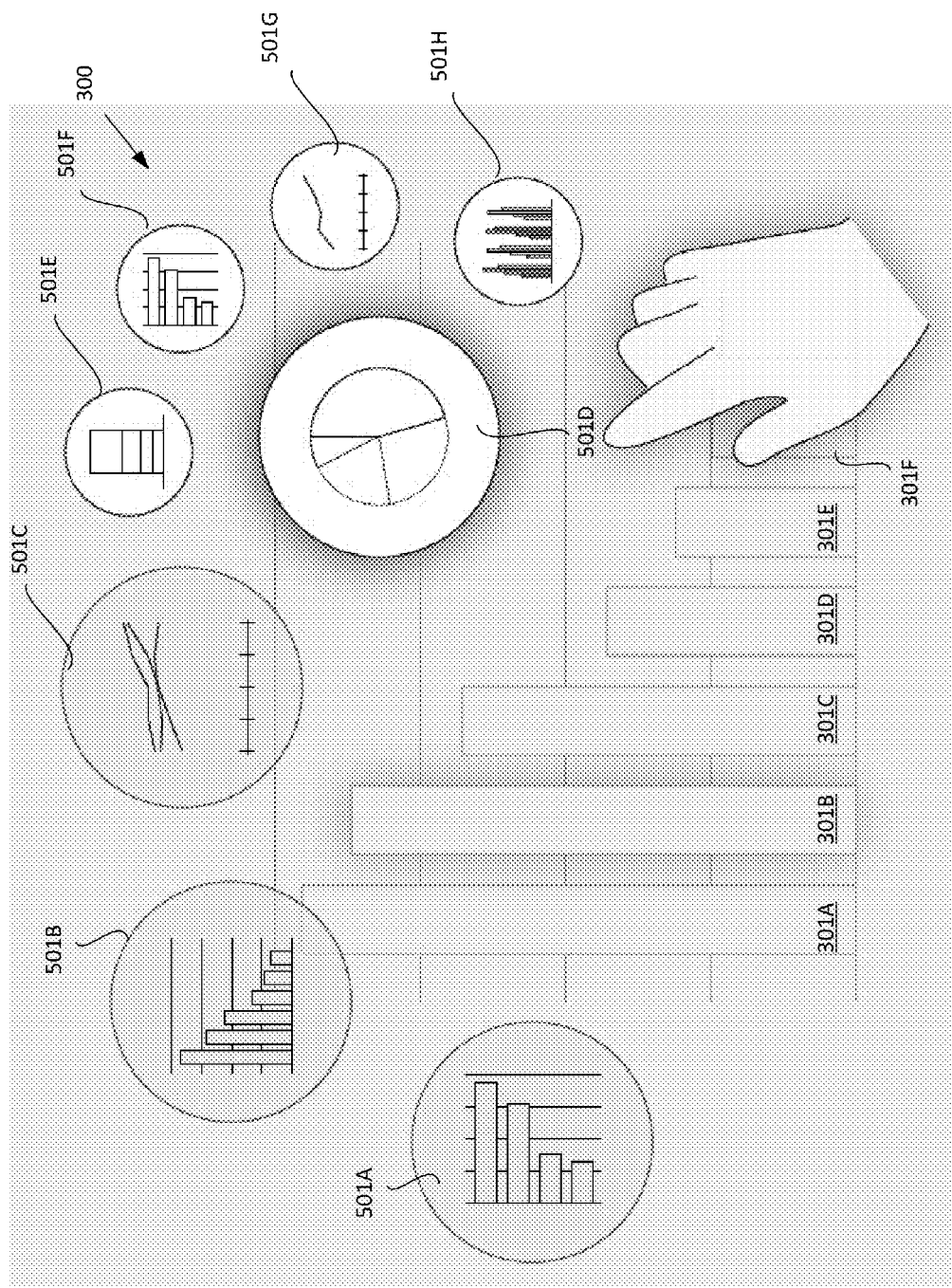

In the example, as shown in FIG. 12, user 100 removes his or her fingers from the screen, and second-level previews 501E-501H are still displayed (along with selected first-level preview 501D and other first-level previews 501A-C). In at least one embodiment, after user 100 removes his or her fingers from the screen, these second-level previews 501E-501H may remain on screen, either until further action by user 100, or for some predefined period of time, after which they may be automatically dismissed.

Referring again to FIG. 2B, user 100 can provide input 215 to cause one of the displayed previews 501 to be expanded; the selected preview is expanded 217. For example, in at least one embodiment, user 100 can tap on a displayed second-level preview 501 to select it. In at least one embodiment, user 100 can rotate contact points 401A, 401B (in a manner similar to that described above in connection with FIGS. 7 and 8) to select among displayed second-level previews 501, by causing an axis 601 defined by the contact points 401A, 401B to rotate to point do different second-level previews 501.

Figure 13:
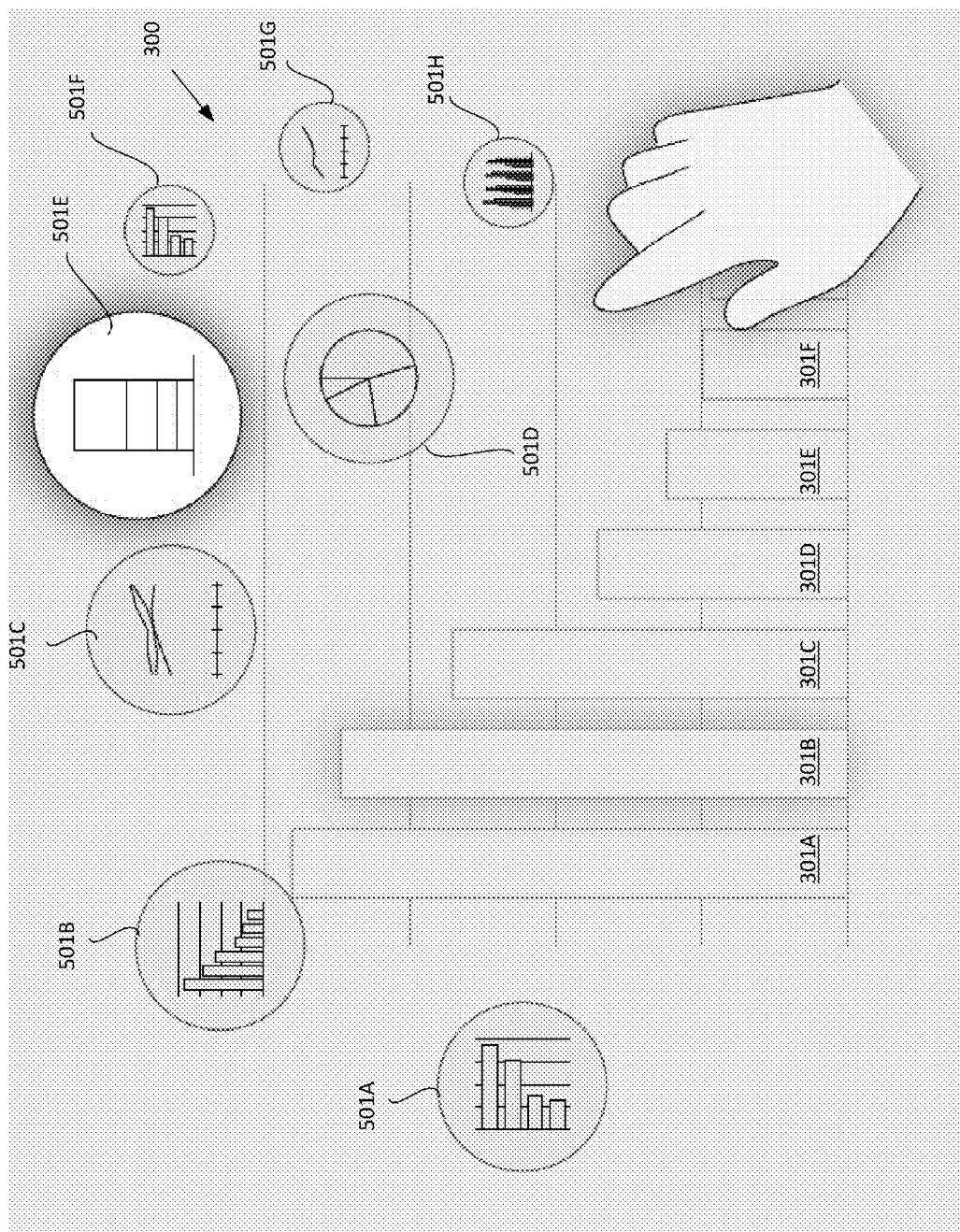
Figure 14:
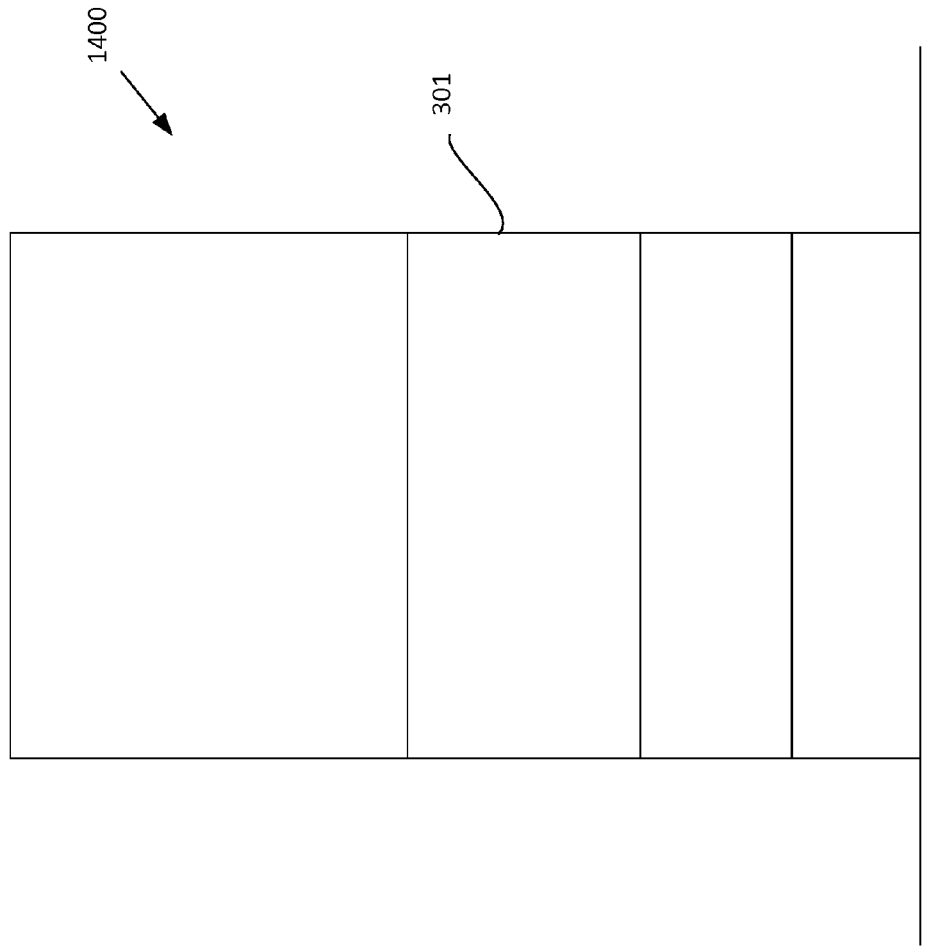

In the example, as shown in FIG. 13, user 100 can select a displayed second-level preview 501E, for example by tapping on it. The selected second-level preview 501E expands so that user 100 can see the associated data visualization. FIG. 14 depicts the displayed visualization 1400, including graph 301 that corresponds to the selected second-level preview 501E.

As described above, all transitions can be implemented in a smooth manner, with previews expanding, changing position, and/or being dismissed gradually using effects such as zooming in/out, fading in/out, and/or dissolving. One skilled in the art will recognize that any suitable transition effects can be used to reinforce relationships between elements as they are moved, introduced, dismissed, or otherwise transitioned from one state to another.

User 100 can dismiss displayed visualization 1400, for example by tapping on or clicking on a dismiss button or icon (not shown), or entering a keyboard command, or by another mechanism. In at least one embodiment, visualization 1400 may automatically be dismissed after some predefined period of time. In at least one embodiment, after visualization 1400 is dismissed, the display may return to its initial state, or to the state that was shown just before visualization 1400 was invoked, or to any other suitable state.

Referring again to FIG. 2B, in at least one embodiment, while previews 501 are displayed, user 100 can provide input 218 to cause the displayed previews 501 to be dismissed; in response, previews 501 are dismissed 219. Any suitable input can be provided for causing such dismissal 219. For example, user 100 can tap on an area of screen 103, or click on a dismiss button, or hit a key, or perform some other input operation to cause previews 501 to be dismissed.

One skilled in the art will recognize that the examples depicted and described herein are merely illustrative, and that other arrangements of user interface elements can be used. In addition, some of the depicted elements can be omitted or changed, and additional elements depicted, without departing from the essential characteristics of the invention.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

Reference in the specification to "one embodiment" or to "an embodiment" means that a particular feature, structure, or characteristic described in connection with the embodiments is included in at least one embodiment of the invention. The appearances of the phrases "in one embodiment" or "in at least one embodiment" in various places in the specification are not necessarily all referring to the same embodiment.

In various embodiments, the present invention can be implemented as a system or a method for performing the above-described techniques, either singly or in any combination. In another embodiment, the present invention can be implemented as a computer program product comprising a non-transitory computer-readable storage medium and computer program code, encoded on the medium, for causing a processor in a computing device or other electronic device to perform the above-described techniques.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, DVD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or non-portable. Examples of electronic devices that may be used for implementing the invention include: a mobile phone, personal digital assistant, smartphone, kiosk, server computer, enterprise computing device, desktop computer, laptop computer, tablet computer, consumer electronic device, or the like. An electronic device for implementing the present invention may use any operating system such as, for example and without limitation: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View, Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A computer-implemented method for dynamically expanding a displayed data visualization, comprising:
   displaying a primary data visualization on a touch-sensitive display screen, the primary data visualization comprising a plurality of display elements, each of the display elements corresponding to a stored data value;
   at an input device, receiving a first user input associated with a first one of the display elements;
   responsive to the received first user input, displaying a plurality of previews of secondary data visualizations relating to the first one of the display elements;
   at the input device, receiving a second user input highlighting one of the displayed previews, comprising at least two points of contact with the touch-sensitive display screen defining an axis pointing to one of the displayed previews;
   at the input device, receiving a third user input activating the highlighted one of the displayed previews; and
   responsive to the received third user input, displaying a secondary data visualization corresponding to the activated one of the displayed previews.

2. The method of claim 1, wherein:
   displaying a plurality of previews of secondary data visualizations comprises displaying the plurality of previews of secondary data visualizations concurrently with continued display of the primary data visualization on the touch-sensitive display screen.

3. The method of claim 1, wherein the secondary data visualizations are associated with the first one of the display elements.

4. The method of claim 1, wherein the secondary data visualizations comprise different representations of data associated with the first one of the display elements.

5. The method of claim 1, wherein the first user input associated with the first one of the display elements comprises a pinch gesture defined by at least two points of contact with the touch-sensitive display screen, the pinch gesture proximate to the display location of the first one of the display elements.

6. The method of claim 1, wherein the first user input associated with a first one of the display elements comprises a pinch gesture defined by at least two points of contact with the touch-sensitive display screen, the pinch gesture having a midpoint proximate to the display location of the first one of the display elements.

7. The method of claim 1, wherein the second user input highlighting one of the displayed previews comprises a pinch gesture.

8. The method of claim 1, wherein the third user input activating the highlighted one of the displayed previews comprises removal of at least one point of contact with the touch-sensitive display screen.

9. The method of claim 1, wherein the primary data visualization comprises a graphical depiction of quantitative data.

10. The method of claim 1, wherein the primary data visualization comprises a bar graph comprising a plurality of bars, and wherein receiving a first user input associated with a first one of the display elements comprises receiving a first user input associated with at least one of the bars.

11. The method of claim 1, wherein displaying the secondary data visualization corresponding to the activated one of the displayed previews comprises displaying a transition effect between displaying the activated one of the displayed previews and displaying the secondary data visualization.

12. A computer-implemented method for dynamically expanding a displayed data visualization, comprising:

displaying a primary data visualization on a touch-sensitive display screen, the primary data visualization comprising a plurality of display elements, each of the display elements corresponding to a stored data value;

at an input device, receiving a first user input associated with a first one of the display elements, the first user input comprising at least two points of contact with the touch-sensitive display screen, the at least two points of contact proximate to a display location of the first one of the display elements, the at least two points of contact defining an axis having an orientation;

responsive to the received first user input, displaying a plurality of previews of secondary data visualizations relating to the first one of the display elements;

highlighting one of the displayed previews responsive to the orientation of the defined axis with respect to a display position of the displayed previews;

at the input device, receiving a second user input selecting one of the displayed previews; and responsive to the received second user input, displaying a secondary data visualization corresponding to the selected one of the displayed previews.

13. The method of claim 12, wherein receiving a second user input selecting one of the displayed previews comprises receiving an input comprising a tap on the touch-sensitive display screen at a location corresponding to one of the displayed previews.

14. A computer-implemented method for dynamically expanding a displayed data visualization, comprising:

displaying a primary data visualization on a touch-sensitive display screen, the primary data visualization comprising a plurality of display elements, each of the display elements corresponding to a stored data value;

at an input device, receiving a first user input associated with a first one of the display elements, the first user input comprising at least two points of contact with the touch-sensitive display screen, the at least two points of contact proximate to a display location of the first one of the display elements, the at least two points of contact defining an axis having an orientation;

responsive to the received first user input, displaying a plurality of previews of secondary data visualizations relating to the first one of the display elements;

at the input device, receiving a second user input selecting one of the displayed previews by specifying an orientation of the defined axis aligned with one of the displayed previews; and responsive to the received second user input, displaying a secondary data visualization corresponding to the selected one of the displayed previews.

15. A computer-implemented method for dynamically expanding a displayed data visualization, comprising:

displaying a primary data visualization on a touch-sensitive display screen, the primary data visualization comprising a plurality of display elements, each of the display elements corresponding to a stored data value;

at an input device, receiving a first user input comprising at least two points of contact with the touch-sensitive display screen, proximate to a display location of a first one of the display elements and defining an axis;

responsive to the received first user input, displaying a plurality of first-level previews of secondary data visualizations relating to the first one of the display elements;

at the input device, receiving a second user input selecting one of the displayed first-level previews by specifying an orientation of the defined axis aligned with one of the displayed previews;

responsive to the received second user input, displaying a plurality of second-level previews of secondary data visualizations;

at the input device, receiving a third user input selecting one of the displayed second-level previews; and responsive to the received third user input, displaying a secondary data visualization corresponding to the selected one of the displayed second-level previews.

16. The method of claim 15, wherein the first user input associated with the first one of the display elements comprises a pinch gesture defined by at least two points of contact with the touch-sensitive display screen, the pinch gesture proximate to the display location of the first one of the display elements.

17. The method of claim 15, wherein the first user input associated with the first one of the display elements comprises a pinch gesture defined by at least two points of contact with the touch-sensitive display screen, the pinch gesture having a midpoint proximate to the display location of the first one of the display elements.

18. A computer-implemented method for dynamically expanding a displayed data visualization, comprising:

displaying a primary data visualization on a touch-sensitive display screen, the primary data visualization comprising a plurality of display elements, each of the display elements corresponding to a stored data value;

at an input device, receiving a first user input comprising at least two points of contact with the touch-sensitive display screen, proximate to a display location of a first one of the display elements and defining an axis;

responsive to the received first user input, displaying a plurality of first-level previews of secondary data visualizations relating to the first one of the display elements;

at the input device, receiving a second user input selecting one of the displayed first-level previews, the second user input comprising:

a user input specifying an orientation of the defined axis aligned with one of the displayed previews; and a user input maintaining the specified orientation for at least a predefined period of time;

responsive to the received second user input, displaying a plurality of second-level previews of secondary data visualizations;

at the input device, receiving a third user input selecting one of the displayed second-level previews; and responsive to the received third user input, displaying a secondary data visualization corresponding to the selected one of the displayed second-level previews.

19. The method of claim 18, wherein receiving a third user input selecting one of the displayed second-level previews comprises receiving a user input tapping on one of the displayed second-level previews.

20. The method of claim 18, wherein receiving a third user input selecting one of the displayed second-level previews comprises:

receiving a user input specifying an orientation of the defined axis aligned with one of the displayed second-level previews.

21. A computer program product for dynamically expanding a displayed data visualization, comprising:
   a non-transitory computer-readable storage medium; and
   computer program code, encoded on the medium, configured to cause at least one processor to perform the steps of:
      causing a touch-sensitive display screen to display a primary data visualization, the primary data visualization comprising a plurality of display elements, each of the display elements corresponding to a stored data value;
      causing the touch-sensitive display screen to receive a first user input associated with a first one of the display elements;
      causing the touch-sensitive display screen to, responsive to the received first user input, display a plurality of previews of secondary data visualizations relating to the first one of the display elements;
      causing the touch-sensitive display screen to receive a second user input highlighting one of the displayed previews, comprising at least two points of contact with the touch-sensitive display screen defining an axis pointing to one of the displayed previews,
      causing the touch-sensitive display screen to receive a third user input activating the highlighted one of the displayed previews; and
      causing the touch-sensitive display screen to, responsive to the received third user input, display a secondary data visualization corresponding to the activated one of the displayed previews.

22. The computer program product of claim 21, wherein: the computer program code configured to cause the touch-sensitive display screen to display a plurality of previews of secondary data visualizations comprises computer program code configured to cause the touch-sensitive display screen to display the plurality of previews of secondary data visualizations concurrently with continued display of the primary data visualization on the touch-sensitive display screen.

23. The computer program product of claim 21, wherein the secondary data visualizations comprise different representations of data associated with the first one of the display elements.

24. The computer program product of claim 21, wherein the first user input associated with the first one of the display elements comprises a pinch gesture defined by at least two points of contact with the touch-sensitive display screen, the pinch gesture proximate to the display location of the first one of the display elements.

25. The computer program product of claim 21, wherein the third user input activating the highlighted one of the displayed previews comprises removal of at least one point of contact with the touch-sensitive display screen.

26. The computer program product of claim 21, wherein the computer program code configured to cause the touch-sensitive display screen to receive a second user input selecting one of the displayed previews comprises the computer program code configured to cause the touch-sensitive display screen to receive an input comprising a tap at a location corresponding to one of the displayed previews.

27. The computer program product of claim 21, wherein the primary data visualization comprises a graphical depiction of quantitative data.

28. The computer program product of claim 21, wherein the primary data visualization comprises a bar graph comprising a plurality of bars, and wherein the computer program code configured to cause the touch-sensitive display screen to receive a first user input associated with a first one of the display elements comprises computer program code configured to cause the touch-sensitive display screen to receive a first user input associated with at least one of the bars.

29. A computer program product for dynamically expanding a displayed data visualization, comprising:
   a non-transitory computer-readable storage medium; and
   computer program code, encoded on the medium, configured to cause at least one processor to perform the steps of:
      causing a touch-sensitive display screen to display a primary data visualization, the primary data visualization comprising a plurality of display elements, each of the display elements corresponding to a stored data value;
      causing the touch-sensitive display screen to receive a first user input associated with a first one of the display elements, comprising at least two points of contact with the touch-sensitive display screen, the at least two points of contact proximate to a display location of the first one of the display elements, wherein the two points of contact define an axis having an orientation;
      causing the touch-sensitive display screen to, responsive to the received first user input, display a plurality of previews of secondary data visualizations relating to the first one of the display elements;
      causing the touch-sensitive display screen to highlight one of the displayed previews responsive to the orientation of the defined axis with respect to a display position of the displayed previews;
      causing the touch-sensitive display screen to receive a second user input selecting one of the displayed previews; and
      causing the touch-sensitive display screen to, responsive to the received second user input, display a secondary data visualization corresponding to the selected one of the displayed previews.

30. A system for dynamically expanding a displayed data visualization, comprising:
   a processor; and
   a touch-sensitive display screen, communicatively coupled to the processor, configured to:
      display a primary data visualization, the primary data visualization comprising a plurality of display elements, each of the display elements corresponding to a stored data value;
      receive a first user input associated with a first one of the display elements, comprising at least two points of contact with the touch-sensitive display screen, the at least two points of contact proximate to a display location of the first one of the display elements, wherein the two points of contact define an axis having an orientation;
      responsive to the received first user input, display a plurality of previews of secondary data visualizations relating to the first one of the display elements;
      highlight one of the displayed previews responsive to the orientation of the defined axis with respect to a display position of the displayed previews;
      receive a second user input selecting one of the displayed previews; and
      responsive to the received second user input, display a secondary data visualization corresponding to the selected one of the displayed previews.

31. The system of claim 30, wherein:
the touch-sensitive display screen is configured to display the plurality of previews of secondary data visualizations concurrently with continued display of the primary data visualization.

32. The system of claim 30, wherein the secondary data visualizations comprise different representations of data associated with the first one of the display elements.

33. The system of claim 30, wherein the first user input associated with the first one of the display elements comprises a pinch gesture defined by at least two points of contact with the touch-sensitive display screen, the pinch gesture proximate to the display location of the first one of the display elements.

34. The system of claim 30, wherein:
the touch-sensitive display screen is configured to receive the second user input selecting one of the displayed previews by receiving an input comprising a tap on the touch-sensitive display screen at a location corresponding to one of the displayed previews.

35. The system of claim 30, wherein the primary data visualization comprises a graphical depiction of quantitative data.

36. The system of claim 30, wherein the primary data visualization comprises a bar graph comprising a plurality of bars, and wherein the touch-sensitive display screen is configured to receive the first user input associated with a first one of the display elements by receiving a first user input associated with at least one of the bars.

37. A system for dynamically expanding a displayed data visualization, comprising:
a processor; and
a touch-sensitive display screen, communicatively coupled to the processor, configured to:
display a primary data visualization, the primary data visualization comprising a plurality of display elements, each of the display elements corresponding to a stored data value;
receive a first user input associated with a first one of the display elements;
responsive to the received first user input, display a plurality of previews of secondary data visualizations relating to the first one of the display elements;
receive a second user input highlighting one of the displayed previews, comprising at least two points of contact with the touch-sensitive display screen defining an axis pointing to one of the displayed previews;
receive a third user input activating the highlighted one of the displayed previews; and
responsive to the received third user input, display a secondary data visualization corresponding to the activated one of the displayed previews.

38. The system of claim 3, wherein the third user input activating the highlighted one of the displayed previews comprises removal of at least one point of contact with the touch-sensitive display screen.

39. A system for dynamically expanding a displayed data visualization, comprising:
a processor; and
a touch-sensitive display screen, communicatively coupled to the processor, configured to:
display a primary data visualization on a display screen, the primary data visualization comprising a plurality of display elements, each of the display elements corresponding to a stored data value;
receive a first user input associated with a first one of the display elements, comprising at least two points of contact with the touch-sensitive display screen, proximate to a display location of the first one of the display elements and defining an axis;
responsive to the received first user input, display a plurality of first-level previews of secondary data visualizations relating to the first one of the display elements;
receive a second user input selecting one of the displayed first-level previews by:
receiving a user input specifying an orientation of the defined axis aligned with one of the displayed previews; and
receiving a user input maintaining the specified orientation for at least a predefined period of time;
responsive to the received second user input, display a plurality of second-level previews of secondary data visualizations;
receive a third user input selecting one of the displayed second-level previews; and
responsive to the received third user input, display a secondary data visualization corresponding to the selected one of the displayed second-level previews.

40. The system of claim 39, wherein the first user input associated with the first one of the display elements comprises a pinch gesture defined by at least two points of contact with the touch-sensitive display screen, the pinch gesture proximate to the display location of the first one of the display elements.

* * * * *